United States Patent
Jo et al.

(10) Patent No.: US 10,051,651 B2
(45) Date of Patent: Aug. 14, 2018

(54) DEVICE AND METHOD FOR ANALYZING NETWORK TOPOLOGY IN WIRELESS COMMUNICATION SYSTEM

(71) Applicant: Samsung Electronics Co., Ltd., Gyeonggi-do (KR)

(72) Inventors: Ohyun Jo, Seoul (KR); Eun-Young Seo, Gyeonggi-do (KR); Seok-Yong Lee, Seoul (KR); Chang-Hyun Kim, Seoul (KR); Kang-Jin Yoon, Seoul (KR); Yong-Chan Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/024,823

(22) PCT Filed: Sep. 23, 2014

(86) PCT No.: PCT/KR2014/008839
§ 371 (c)(1),
(2) Date: Mar. 24, 2016

(87) PCT Pub. No.: WO2015/046860
PCT Pub. Date: Apr. 2, 2015

(65) Prior Publication Data
US 2016/0219611 A1    Jul. 28, 2016

(30) Foreign Application Priority Data

Sep. 24, 2013 (KR) .................. 10-2013-0113501
Sep. 4, 2014 (KR) .................. 10-2014-0117781

(51) Int. Cl.
*H04W 72/04* (2009.01)
*H04W 72/12* (2009.01)
(Continued)

(52) U.S. Cl.
CPC ....... *H04W 72/1231* (2013.01); *H04W 24/08* (2013.01); *H04W 72/046* (2013.01);
(Continued)

(58) Field of Classification Search
CPC H04W 24/08; H04W 72/046; H04W 72/1231
See application file for complete search history.

(56) References Cited

U.S. PATENT DOCUMENTS 9,106,286 B2 * 8/2015 Agee .................... H04B 7/0413
2008/0008147 A1 1/2008 Nakayama
(Continued)

FOREIGN PATENT DOCUMENTS

EP          3079424 A1    10/2016
KR    10-2009-0020955    2/2009
(Continued)

OTHER PUBLICATIONS

International Search Report dated Dec. 24, 2014 in connection with International Patent Application No. PCT/KR2014/008839, 5 pages.
(Continued)

*Primary Examiner* — David Bilodeau

(57) ABSTRACT

The objective of the present invention is to analyze a network topology in a wireless communication system. A method for operating a node performing wireless communication comprises the steps of: decoding a packet in order to acquire information on peripheral links, for transmitting the packet, from the packet that does not use the node as a source or a destination; and transmitting, to a control node for performing scheduling, a message including the information on the peripheral links. In addition, the present invention includes the above-mentioned embodiment and the other embodiments.

20 Claims, 19 Drawing Sheets

(51) Int. Cl.
*H04W 24/08* (2009.01)
*H04W 72/08* (2009.01)
*H04W 16/28* (2009.01)

(52) U.S. Cl.
CPC ..... *H04W 72/082* (2013.01); *H04W 72/1284* (2013.01); *H04W 16/28* (2013.01)

(56) References Cited

U.S. PATENT DOCUMENTS

| | | | |
|---|---|---|---|
| 2008/0075033 A1* | 3/2008 | Shattil | H04B 7/026 370/328 |
| 2008/0112368 A1* | 5/2008 | Kwon | H04W 72/0406 370/336 |
| 2009/0286465 A1 | 11/2009 | Lin et al. | |
| 2010/0008247 A1 | 1/2010 | Kwon et al. | |
| 2011/0103240 A1 | 5/2011 | Taghavi Nasrabadi et al. | |
| 2012/0008568 A1 | 1/2012 | Gong et al. | |
| 2012/0120892 A1 | 5/2012 | Freda et al. | |
| 2012/0269069 A1* | 10/2012 | Porat | H04W 72/1231 370/241 |
| 2013/0003689 A1 | 1/2013 | Kwon et al. | |
| 2014/0226508 A1* | 8/2014 | Asplund | H04L 1/002 370/252 |
| 2015/0117239 A1* | 4/2015 | Lindoff | H04W 72/08 370/252 |
| 2015/0358904 A1* | 12/2015 | Kwon | H04W 52/0206 370/252 |

FOREIGN PATENT DOCUMENTS

| | | |
|---|---|---|
| KR | 10-2011-0102847 | 9/2011 |
| KR | 20110102847 | 9/2011 |
| KR | 10-2012-0073750 | 7/2012 |
| KR | 10-2012-0093314 | 8/2012 |
| KR | 10-1181577 | 9/2012 |
| WO | 2014110397 A1 | 7/2014 |

OTHER PUBLICATIONS

Written Opinion of International Searching Authority dated Dec. 24, 2014 in connection with International Patent Application No. PCT/KR2014/008839, 6 pages.
"Broadband Radio Access Networks (BRAN); Very High Capacity Density BWA Networks; Protocols," ETSI TR 101 589, v1.1.1, Technical Report, Jun. 2013, 62 pages.
Choi, S., et al., "Transmitter Power Control (TPC) and Dynamic Frequency Selection (DFS) Joint Proposal for 802.11h WLAN," IEEE P802.11, Wireless LANs, doc.:IEEE 802.11-01/169r1, May 14, 2001, 17 pages.
"Cognitive Radio Systems in the Land Mobile Services," Working Party 5A, Sub-Working Group 5A5-1, Working Document Towards a Preliminary Draft New Report ITU-R [LMS.CRS], Radiocommunication Study Groups, Document 5A/TEMP/224-E, May 19, 2010, 68 pages.
"IEEE Standard for Information Technology—Telecommunications and Information Exchange Between Systems; Local and Metropolitan Area Networks—Specific Requirements Part 11: Wireless LAN Medium Access Control (MAC) and Physical Layer (PHY) Specifications; Amendment 3: Enhancements for Very High Throughput in the 60 GHz Band," IEEE Std 802.11ad™-2012; IEEE Computer Society; Dec. 28, 2012, 628 pages.
Foreign Communication From a Related Counterpart Application, European Application No. 14848467.8-1854, Extended European Search Report dated Mar. 17, 2017, 17 pages.
Foreign Communication from Related Counterpart Application; European Patent Application No. 14848467.8; Communication pursuant to Article 94(3) EPC dated Mar. 22, 2018; 8 pages.

\* cited by examiner

FIG.4

| ID | LENGTH | THE NUMBER OF LINKS | SOURCE ADDRESS OF LINK #1 | DESTINATION ADDRESS OF LINK #1 | SOURCE ADDRESS OF LINK #2 | DESTINATION ADDRESS OF LINK #2 | ... | SOURCE ADDRESS OF LINK #N | DESTINATION ADDRESS OF LINK #N |
|---|---|---|---|---|---|---|---|---|---|
| 401 | 403 | 405 | 407-1 | 409-1 | 407-2 | 409-2 | | 407-N | 409-N |

| ID | LENGTH | THE NUMBER OF LINKS | SOURCE ADDRESS OF LINK #1 | DESTINATION ADDRESS OF LINK #1 | DURATION OF LINK #1 | ... | SOURCE ADDRESS OF LINK #N | DESTINATION ADDRESS OF LINK #N | DURATION OF LINK #N |
|---|---|---|---|---|---|---|---|---|---|
| 501 | 503 | 505 | 507-1 | 509-1 | 511-1 | | 507-N | 509-N | 511-N |

| ID | LENGTH | THE NUMBER OF AVAILABLE BEAMS | BEAM #1 | MEASUREMENT INFO #1 | BEAM #2 | MEASUREMENT INFO #2 | ... | BEAM #N | MEASUREMENT INFO #N |
|---|---|---|---|---|---|---|---|---|---|
| 1201 | 1203 | 1211 | 1213-1 | 1217-1 | 1213-2 | 1217-2 | | 1213-N | 1217-N |

FIG.12

| 1301 | 1303 | 1321 | 1323 | 1325 | 1327 |
|---|---|---|---|---|---|
| ID | LENGTH | INFO ON BEAM BEING USED | THE NUMBER OF ALTERNATIVE BEAMS | BEAM IDENTIFICATION INFO | MEASUREMENT INFO |

FIG.13

DEVICE AND METHOD FOR ANALYZING NETWORK TOPOLOGY IN WIRELESS COMMUNICATION SYSTEM

CROSS-REFERENCE TO RELATED APPLICATION(S)

The present application claims priority under 35 U.S.C. § 365 to International Patent Application No. PCT/KR2014/008839 filed Sep. 23, 2014, entitled "DEVICE AND METHOD FOR ANALYZING NETWORK TOPOLOGY IN WIRELESS COMMUNICATION SYSTEM", and, through International Patent Application No. PCT/KR2014/008839, to Korean Patent Application No. 10-2013-0113501 filed Sep. 24, 2013 and Korean Patent Application No. 10-2014-0117781 filed Sep. 4, 2014, each of which are incorporated herein by reference into the present disclosure as if fully set forth herein.

TECHNICAL FIELD

The present invention relates to the analysis of a network topology in a wireless communication system.

BACKGROUND OF THE INVENTION

In a wireless communication system, a scheduling algorithm is an essential function. The scheduling signifies the determination of when and how to allocate system resources, such as frequency, time, space, and the like. Usable resources are limited by the characteristics of a wireless network, and further, since more effective utilization of resources is required due to a rapid increase in demand for service capacity, the necessity of efficient scheduling is gradually increasing.

Typically, a wireless communication system is operated in a determined frequency band. For example, in the case of systems in the 802.11 family, including an 802.1 lad system, multiple users may simultaneously exist in a network. In this case, due to limited resources, the greater the number of users, the lower a data rate by which each user can be serviced. Particularly, a system, that accesses a wireless channel on the basis of contention as in the systems in the 802.11 family, has a noticeable reduction phenomenon of a data rate. Accordingly, a scheduling technique which enables the avoidance of contention and can increase the efficiency of resources is required.

For effective scheduling, it is important to recognize the distribution of users in a network and an interference relation between links of the users, namely, a network topology. This is because when the network topology is capable of being accurately determined, efficient scheduling such as the maximization of spatial reuse and the like can be performed.

DETAILED DESCRIPTION OF THE INVENTION

Technical Problem

Therefore, an embodiment of the present invention provides an apparatus and a method for performing efficient scheduling in a wireless communication system.

Another embodiment of the present invention provides an apparatus and a method for analyzing a network topology in a wireless communication system.

Still another embodiment of the present invention provides an apparatus and a method for determining an interference relation without performing a separate measurement procedure in a wireless communication system.

Yet another embodiment of the present invention provides an apparatus and a method for determining an interference relation by using a data packet in a wireless communication system.

Still yet another embodiment of the present invention provides an apparatus and a method for transmitting information on an adjacent link acquired through a data packet in a wireless communication system.

SUMMARY OF THE INVENTION

In accordance with an aspect of the present invention, an operating method for performing wireless communication by a node in a wireless communication system is provided. The operating method includes decoding a packet, which does not have the node as a source or a destination, in order to acquire information on an adjacent link, which delivers the packet, from the packet; and transmitting a message including the information on the adjacent link, to a control node that performs scheduling.

In accordance with another aspect of the present invention, an operating method for performing scheduling by a node in a wireless communication system is provided. The operating method includes receiving, from another node, a message including information on a link delivering a packet, which does not have the another node as a source or a destination, that has been acquired from the packet; and determining an interference relation between links in a network based on the information included in the message.

In accordance with still another aspect of the present invention, a node apparatus for performing wireless communication in a wireless communication system is provided. The node apparatus includes a control unit that performs a control operation for decoding a packet, which does not have the node as a source or a destination, in order to acquire information on an adjacent link, which delivers the packet, from the packet; and a transmission/reception unit that transmits a message including the information on the adjacent link, to a control node that performs scheduling.

In accordance with yet another aspect of the present invention, a node apparatus for performing scheduling in a wireless communication system is provided. The node apparatus includes a transmission/reception unit that receives, from another node, a message including information on a link delivering a packet, which does not have the another node as a source or a destination, that has been acquired from the packet; and a control unit that determines an interference relation between links in a network based on the information included in the message.

Advantageous Effects

A network topology can be recognized through message passing in a wireless communication system, and thereby, links interfering with each other can be determined without performing channel measurement. Further, scheduling capable of maximizing spatial reuse on the basis of an interference relation can be performed. Also, a beam used by STAtions (STAs) can be changed, and thereby, scheduling capable of minimizing the interference relation and maximizing the spatial reuse can be performed.

BRIEF DESCRIPTION OF THE DRAWINGS

FIG. 4 illustrates a configuration example of a message providing adjacent link information in a wireless communication system according to an embodiment of the present invention.

FIG. 5 illustrates a configuration example of a message providing adjacent link information in a wireless communication system according to another embodiment of the present invention.

FIG. 6 illustrates a configuration example of a message providing adjacent link information in a wireless communication system according to still another embodiment of the present invention.

FIG. 12 illustrates a configuration example of a message providing adjacent link information in a wireless communication system according to still another embodiment of the present invention.

FIG. 13 illustrates a configuration example of a message providing adjacent link information in a wireless communication system according to yet another embodiment of the present invention.

DETAILED DESCRIPTION OF THE INVENTION

Figure 1A:
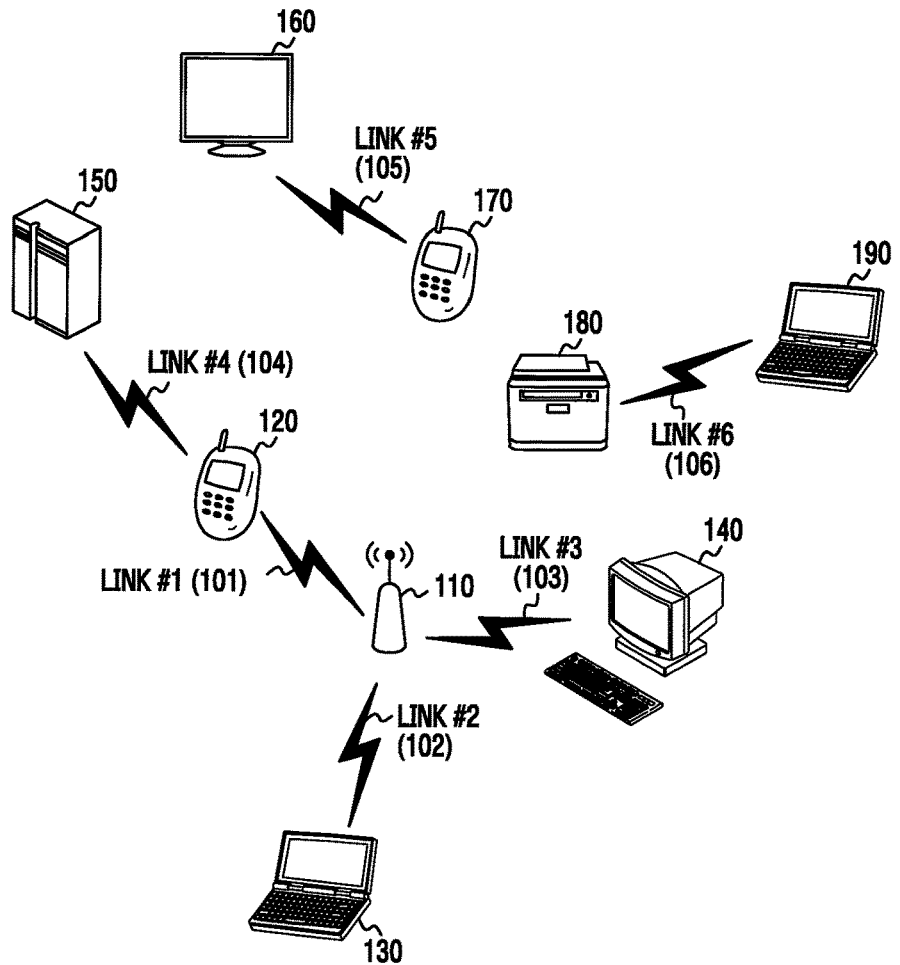
FIG. 1 illustrates an example of an interference relation in a wireless communication system according to an embodiment of the present invention.

Hereinafter, the operating principle of the present invention will be described in detail with reference to the accompanying drawings. In describing the present invention below, a detailed description of related known configurations or functions incorporated herein will be omitted when it is determined that the detailed description thereof may unnecessarily obscure the subject matter of the present invention. Also, terms described below are defined in view of functions in the present invention, and can be different depending on user and operator's intention or practice. Therefore, the terms should be defined based on the disclosure throughout this specification.

Hereinafter, a description will be made of a technology for analyzing a network topology in a wireless communication system in the present invention.

The present invention may be applied to all wireless communication systems including a user scheduling function, including systems in the Institute of Electrical and Electronical Engineers (IEEE) 802.11 family. In this regard, hereinafter, for convenience of description, the present invention will be described based on an IEEE 802.11ad system, and terms and names defined in the IEEE 802.11ad standard will be used in describing the present invention. However, the present invention is not limited by the terms and names, and may be similarly applied to even systems which comply with other standards.

The IEEE 802.11ad system aims at a very high data rate of several GHz in a 60 GHz band. In order to achieve an objective of a high data rate, the IEEE 802.11ad system uses a beamforming technique. Beamforming of the IEEE 802.11ad system is a scheme using an array antenna, and causes a beam of an antenna to have directivity. Typically, the beamforming may be implemented in various schemes, but a benefit, which is desired to be achieved through the beamforming, is to increase the efficiency of an antenna in such a manner to focus wireless signals to a particular user or in a particular direction.

The 60 GHz band, in which the IEEE 802.11ad system operates, is a frequency band slightly higher than a frequency band for conventional communication, and the directionality of a signal is very strong in the 60 GHz band. Accordingly, when energy is not focused in the particular direction, the efficiency of signal transmission is too low. When a signal is transmitted in a state of focusing energy of the signal, the strength of a signal received by the relevant user increases, but the strength of interference, which reaches users located in other directions, is reduced. Accordingly, the beamforming is advantageous in that a Signal-to-Noise Ratio (SNR) at the side of the user is increased and thereby, a data rate not only becomes higher but also it is possible to achieve spatial reuse which allows an identical resource to be simultaneously allocated to different users.

Typically, in a distributed network, users occupy wireless media on the basis of contention. A user continuously observes a wireless network. When it is determined that no user is using the wireless media during the observation, the user attempts to access the wireless media at a random time point. At this time, a situation may occur in which the multiple users simultaneously attempt to access the wireless media and data is lost. A phenomenon in which the data is lost due to the attempt for the simultaneous access is referred to as a "collision." When the collision occurs, no user may use the wireless media, and all of the users re-contend. The collision may lead to a waste of resources, which may become a cause of the degradation of system performance.

In the case of the existing systems in the IEEE 802.11 family, the purpose of scheduling is to prevent contention between users and thereby avoid a case where multiple users simultaneously attempt to access wireless media. As the number of users becomes larger, contention for occupying the wireless media becomes more severe, and a probability of occurrence of a collision also increases exponentially. Accordingly, a controller may provide an opportunity which enables each user to independently occupy the wireless media on the basis of a request of each user. Therefore, a waste of resources caused by the collision is prevented, and the utilization efficiency of the wireless media is increased, so that system performance can be improved. Particularly, the IEEE 802.11ad system allows a user to independently occupy the wireless media during a Service Period (SP). Also, the IEEE. 802.11ad system supports a scheme which enables multiple users to simultaneously access the wireless media. Specifically, the IEEE 802.11ad system enables scheduling which allows multiple users to simultaneously use an identical resource.

As described above, for the scheduling which allows multiple users to simultaneously use an identical resource, namely, spatial reuse, a technology is required for recognizing an interference relation between links of users, namely, a network topology. Further, a scheduling technology is also required for efficiently allocating resources on the basis of the recognized interference relation.

Figure 1B:
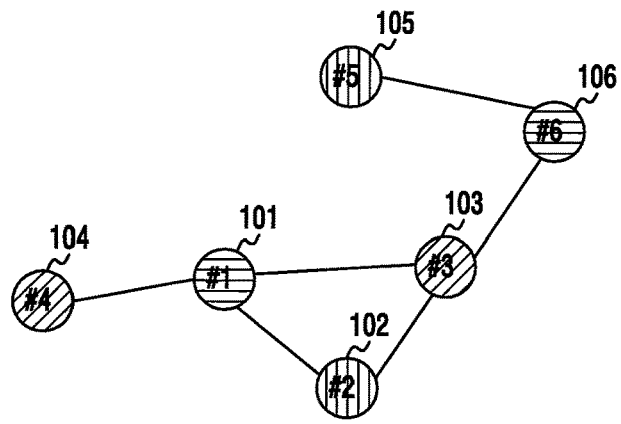

FIG. 1 illustrates an example of an interference relation in a wireless communication system according to an embodiment of the present invention. (a) of FIG. 1 illustrates an example of an interference relation, and (b) of FIG. 1 illustrates an example of network topology information representing the interference relation.

Referring to (a) of FIG. 1, nine nodes 110, 120, 130, 140, 150, 160, 170, 180, and 190 form a wireless network. The first node 110 configures a link #1 101 with the second node 120, configures a link #2 102 with the third node 130, and configures a link #3 103 with the fourth node 140. Also, the second node 120 configures a link #4 104 with the fifth node 150. The sixth node 160 and the seventh node 170 configure a link #5 105, and the eighth node 180 and the ninth node 190 configure a link #6 106. The nine nodes 110, 120, 130, 140, 150, 160, 170, 180, and 190 may be referred to as "STAtions (STAs)," and one node that performs scheduling among the nine nodes may be referred to as a "Personal Basic Service Set (PBSS) Control Point (PCP)."

(b) of FIG. 1 illustrates the interference relation in the environment illustrated in (a) of FIG. 1. Vertices 101 to 106 represent a link between two nodes. Also, an edge connecting between links represents a relation in which the links interfere with each other. Specifically, the link #1 101 mutually interferes with the link #4 104, the link #2 102, and the link #3 103. Also, the link #3 103 mutually interferes with the link #2 102 and the link #6 106. Further, the link #6 106 mutually interferes with the link #3 103 and the link #5 105. Accordingly, an identical resource may be allocated between links that do not interfere with each other. In (b) of FIG. 1, when respective links, between which an edge is connected, are represented according to graph coloring rules by which the links are necessarily represented by shades of different patterns, spatial reuse between links represented by a shade of an identical pattern may be achieved. Specifically, it is possible to achieve spatial reuse between the link #1 101 and the link #6 106, spatial reuse between the link #2 102 and the link #5 105, and spatial reuse between the link #3 103 and the link #4 104.

Figure 2:
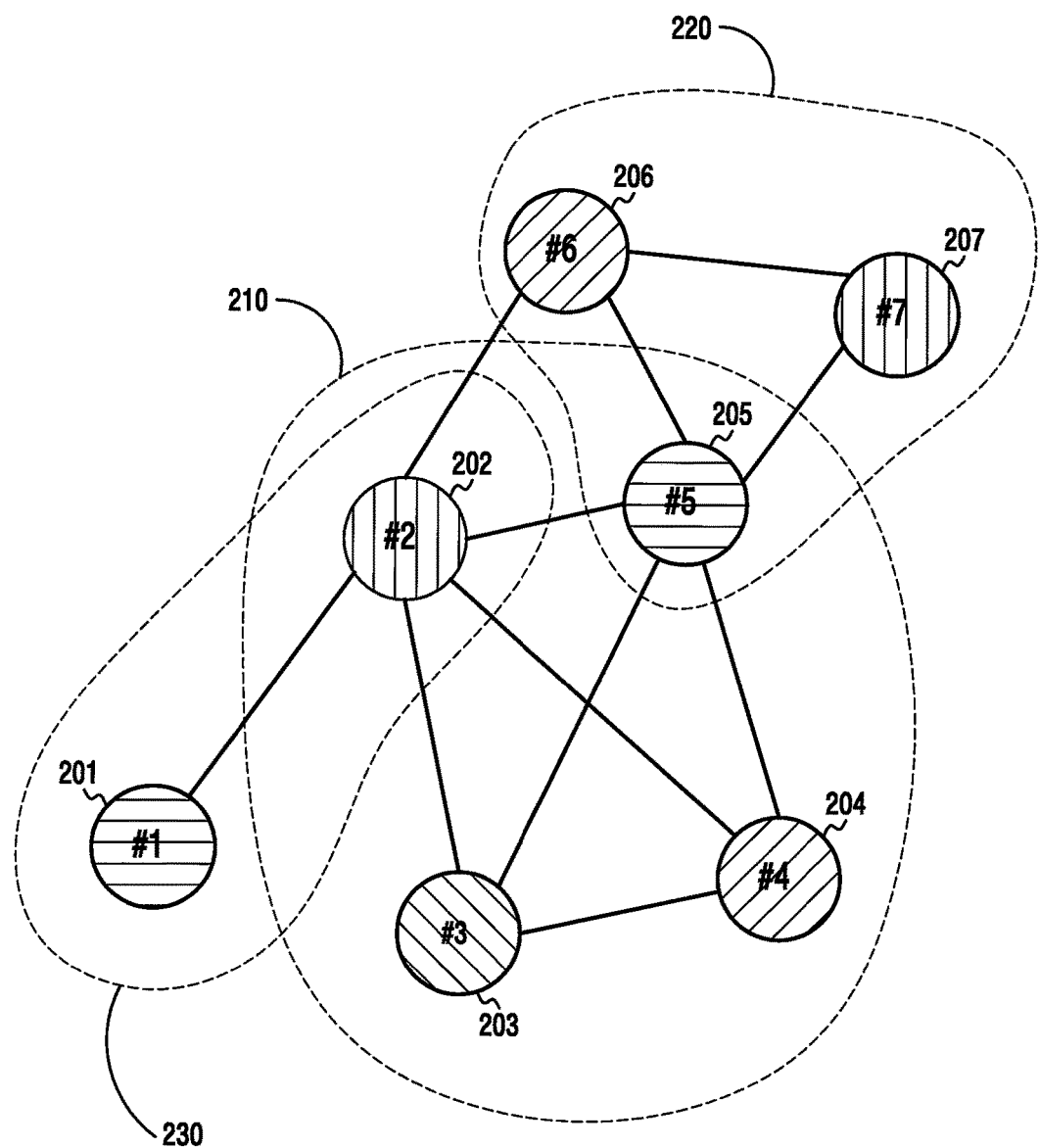
FIG. 2 illustrates an example of the determination of a spatial reuse factor in a wireless communication system according to an embodiment of the present invention.

FIG. 2 illustrates an example of the determination of a spatial reuse factor in a wireless communication system according to an embodiment of the present invention.

Referring to FIG. 2, the link #1 201 and the link #2 202 interfere with each other. Also, the link #2 202, the link #3 203, the link #4 204, and the link #5 205 interfere with each other. Further, the link #4 204, the link #6 206, and the link #7 207 interfere with each other.

When a complete graph is configured in an interference graph illustrated in FIG. 2, a first complete graph 210 having a degree of 4, a second complete graph 220 having a degree of 3, and a third complete graph 230 having a degree of 2 are configured. The complete graph signifies a set of vertices, which are included in the complete graph and of which all pairs are connected by edges. The degree of the complete graph signifies the number of vertices included in the complete graph. Specifically, in the case of the first complete graph 210, the link #2 202, the link #3 203, the link #4 204, and the link #5 205 are respectively connected to other links of the first complete graph 210. Also, in the case of the second complete graph 220, the link #4 204, the link #6 206, and the link #7 207 are respectively connected to other links of the second complete graph 220. Further, in the case of the third complete graph 230, the link #1 201 and the link #2 202 are respectively connected to other links of the third complete graph 230.

A spatial reuse factor is determined based on the complete graphs 210, 220, and 230. First, a spatial reuse factor as large as the degree of the first complete graph 210 is assigned to the first complete graph 210 having the maximum degree. Accordingly, each of the link #2 202, the link #3 203, the link #4 204, and the link #5 205 is assigned a spatial reuse factor of 4.

Thereafter, a spatial reuse factor is assigned to the second complete graph 220 having the second largest degree. At this time, the second complete graph 220 includes the link #5 205 which has already been assigned the spatial reuse factor of 4. The spatial reuse factor of 4, which has already been assigned to the link #5 205, is not changed. Accordingly, the spatial reuse factor, which has already been assigned to the link #5 205, affects a spatial reuse factor of each of the link #6 206 and the link #7 207. For example, the spatial reuse factor of the link #5 205 is equal to 4, and thus, the link #5 205 may maximally occupy one-fourth of the total amount of resources. Accordingly, since the link #6 206 and the link #7 207 may bisect the remaining three-fourths and may each occupy one-half of the remaining three-fourths, each of the link #6 206 and the link #7 207 may maximally occupy three-eighths. As a result, each of the link #6 206 and the link #7 207 is assigned a spatial reuse factor of 8/3.

Lastly, a spatial reuse factor is assigned to the third complete graph 230 having the smallest degree. At this time, the third complete graph 220 includes the link #2 202 which has already been assigned the spatial reuse factor of 4. The spatial reuse factor of 4, which has already been assigned to the link #2 202, is not changed. Accordingly, the spatial reuse factor, which has already been assigned to the link #2 202, affects a spatial reuse factor of the link #1 201. For example, the spatial reuse factor of the link #2 202 is equal to 4, and thus, the link #2 202 may maximally occupy one-fourth of the total amount of resources. Accordingly, the link #1 201 may occupy the remaining three-fourths. As a result, the link #1 201 is assigned a spatial reuse factor of 4/3.

Figure 3:
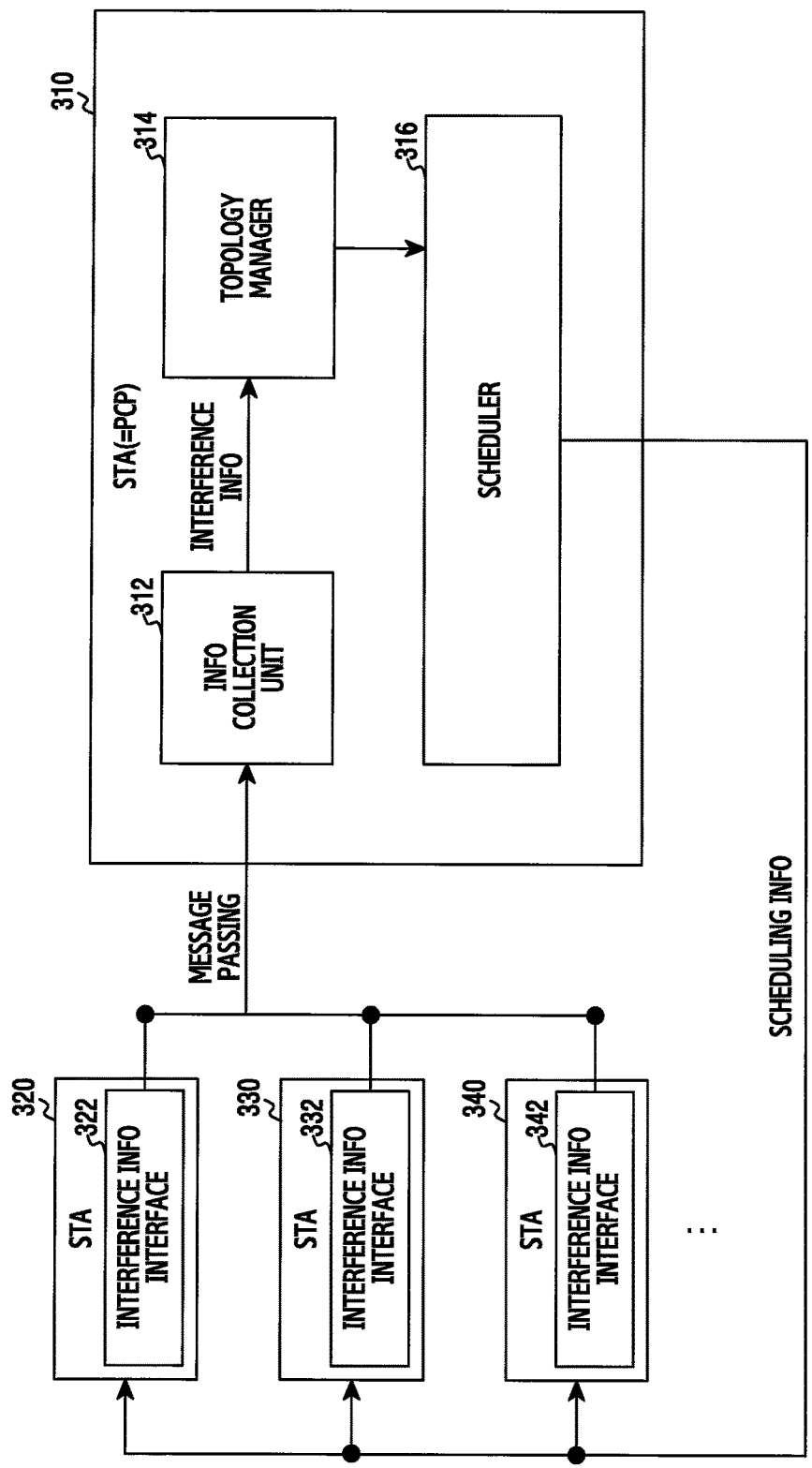
FIG. 3 illustrates functional blocks of nodes in a wireless communication system according to an embodiment of the present invention.

FIG. 3 illustrates functional blocks of nodes in a wireless communication system according to an embodiment of the present invention. FIG. 3 illustrates nodes for analyzing a network topology and scheduling as described above, specifically, a PCP 310 and STAs 320, 330, and 340.

According to an embodiment of the present invention, an interface and a protocol, which enables information to be exchanged through a message format defined between the PCP 310 and the STAs 320, 330, and 340, are required to exchange adjacent link-related information. A form of the exchanged information may be changed according to a level or configuration of an algorithm. Accordingly, according to an embodiment of the present invention, the STAs 320, 330, and 340 respectively include interference information interfaces 322, 332, and 342 that may generate and understand a message format defined in order to exchange interference information.

The PCP 310 includes an information collection unit 312 that collects adjacent link-related information from the STAs 320, 330, and 340 through the interference information interfaces. The provision of information from the STAs 320, 330, and 340 to the PCP 310 may be referred to as "message passing." Information, that the PCP 310 has collected through the message passing, is stored in a DataBase (DB) of the information collection unit 312 of the PCP 310, and interference information is provided to a topology manager 314. The topology manager 314 generates information as shown in Table 1 below. Table 1 below is an example of considering a situation of the existence of three links.

TABLE 1

| Link index | Source address | Destination address | Link index of interference relation | Duration information |
|---|---|---|---|---|
| 1 | aaaaaaaa | bbbbbbbb | 2, 3 | 500 µs |
| 2 | cccccccc | dddddddd | 1 | 800 µs |
| 3 | eeeeeeee | ffffffff | 1 | 900 µs |

Then, the topology manager 314 generates an interference graph capable of expressing interference information on the basis of the information as shown in Table 1. For example, the interference graph may have a form illustrated in (b) of FIG. 1. The interference graph is provided to a scheduler 316.

The scheduler 316 allocates resources according to an algorithm which is based on the interference graph. For example, the scheduler 316 may exclusively allocate resources to interference links affecting each other, and thereby may perform optimal scheduling capable of maximizing spatial reuse. Scheduling information determined by the scheduler 316 is provided to the STAs 320, 330, and 340. For example, the scheduling information may be provided through a beacon signal.

Hereinafter, a detailed description will be made of the above-described process for analyzing a network topology and scheduling in the present invention.

A process for collecting adjacent link-related information through message passing is as follows.

According to an embodiment of the present invention, a PCP does not perform direct channel measurement, and use is made of information obtained while STAs perform communication. The STAs perform carrier sensing. When communication between adjacent nodes is performed in a range which enables a signal to be received, the relevant STA may detect energy of a signal. When the energy of the signal is detected, the STA confirms a Media Access Control (MAC) address at a header of a packet, and determines whether the packet is transmitted to the STA itself, by using the MAC address. When a destination of the packet is the STA itself, the STA decodes a payload part of the packet. In contrast, when the destination of the packet is another STA, the STA does not decode the payload. In this regard, when the destination of the packet is another STA, the STA may confirm duration information, a source address, and a destination address, which are included in the packet, in order to set a Network Allocation Vector (NAV) timer.

As described above, the STA may detect the packet transmitted/received over another link, and thereby may recognize, for itself, information on a link which may interfere with the STA itself around the STA. The STA may transmit the information on the interference, that the STA itself has recognized, to the PCP. Accordingly, the PCP may recognize the entire network topology. Specifically, in the case of the related art, in order to recognize a network topology, a PCP indicates channel measurement to each STA, receives a report on a result of the measurement from each STA, and then may recognize how much interference occurs between the STAs, on the basis of the reported result of the measurement. However, in an embodiment of the present invention, each STA may notify the PCP of adjacent interference node information, duration information, channel information, and the like, that each STA manages for itself, through message passing, and the PCP may recognize the network topology without indicating channel measurement.

Figure 6:
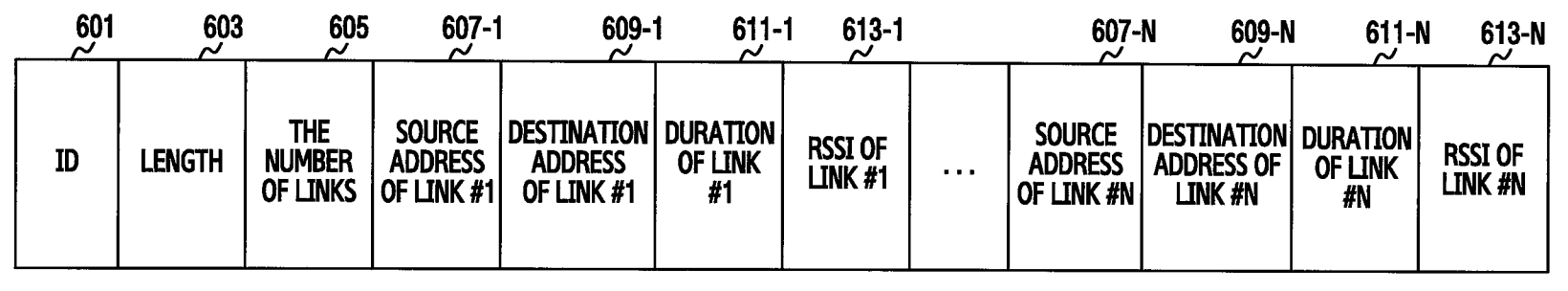

Messages, that the PCP receives from the respective STAs in order to recognize the network topology, may be defined as illustrated in FIG. 4, FIG. 5, and FIG. 6.

FIG. 4 illustrates a configuration example of a message providing adjacent link information in a wireless communication system according to an embodiment of the present invention. Referring to FIG. 4, the message includes an IDentifier (ID) 401 representing identification information of the message, a length 403 representing the size of the message, the number 405 of links representing the number of adjacent links from which energy is detected, source addresses 407-1 to 407-N of adjacent links, and destination addresses 409-1 to 409-N of the adjacent links. The message illustrated in FIG. 4 allows each STA to notify the PCP of information on a link which interferes with each STA around each STA. Specifically, the PCP may recognize a link, which interferes with the relevant STA in a network, through a source address and a destination address.

FIG. 5 illustrates a configuration example of a message providing adjacent link information in a wireless communication system according to another embodiment of the present invention. Referring to FIG. 5, the message includes an ID 501 representing identification information of the message, a length 503 representing the size of the message, the number 505 of links representing the number of adjacent links from which energy is detected, source addresses 507-1 to 507-N of adjacent links, destination addresses 509-1 to 509-N of the adjacent links, and durations 511-1 to 511-N each representing a time length during which an adjacent link is maintained. When compared with FIG. 4, the message illustrated in FIG. 5 further includes duration information in addition to the source addresses and the destination addresses. Each STA may recognize how long data communication over an adjacent link is maintained, through a duration field of a packet. Since the duration is included in the message, the PCP may update network topology information even without additional message passing. For example, when a duration of a particular link elapses, the PCP may delete the particular link from links which interfere with STAs.

FIG. 6 illustrates a configuration example of a message providing adjacent link information in a wireless communication system according to still another embodiment of the present invention. Referring to FIG. 6, the message includes an ID 601 representing identification information of the message, a length 603 representing the size of the message, the number 605 of links representing the number of adjacent links from which energy is detected, source addresses 607-1 to 607-N of adjacent links, destination addresses 609-1 to 609-N of the adjacent links, durations 611-1 to 611-N each representing a time length during which an adjacent link is maintained, and Received Signal Strength Indicators (RSSIs) 613-1 to 613-N each representing the degree of interference from an adjacent link. When compared with FIG. 5, the message illustrated in FIG. 6 further includes information representing the degree of interference. Specifically, the message illustrated in FIG. 6 includes channel information (e.g., an RSSI, etc.) on an adjacent link. In a case where the message illustrated in FIG. 6 is used, when each STA notifies of a situation on an adjacent link, each STA does not notify of only whether energy is detected from another link, but may notify of how much another link interferes. The PCP may perform scheduling by using information on the degree of interference. For example, when two links interfering with each other exist but an effect of the interference is not large, it can improve data throughput from the viewpoint of the entire network that the two links simultaneously use an identical resource although the two links interfere with each other to a certain degree. When the channel information on an adjacent link is provided as illustrated in FIG. 6, the PCP may perform scheduling for improving network throughput from the viewpoint of the entire network.

The message illustrated in FIG. 4, FIG. 5, or FIG. 6 may be transmitted through a frame, a message, or a channel defined in order to transmit the adjacent link information. Alternatively, in the case of systems in the IEEE 802.11 family, the adjacent link information may be transmitted through an information request/response frame. For example, the adjacent link information may be included in a vender specific element of the information request/response frame.

The generation of topology information using information on a source and a destination is as follows.

A PCP may generate topology information by using the information on a source and a destination on the basis of information collected from each STA. For example, the topology information may include the interference graph illustrated in (b) of FIG. 1. The PCP may send a request for information of adjacent links to each STA, and may recognize a link, which interferes with another adjacent link, through the above-described message. Then, the PCP may match each link to one vertex, may connect an edge between links which interfere with each other, and may generate an interference graph. The interference graph ideologically expresses an interference relation. Interference information that the PCP generates may be expressed in a table form as shown in Table 1. All links included in adjacent link information, which is received from a STA which becomes a main agent of a particular link, are added to an interference link list of the relevant link.

When channel information (e.g., an RSSI) with an interference link is provided, network topology information may be generated as follows.

When the message illustrated in FIG. 6 is used, the PCP may collect channel information of an adjacent link. When the channel information is included in adjacent link information provided by each STA, the PCP does not determine a final interference relation on the basis of only whether interference occurs, but may further consider the channel information. For example, the PCP may determine an interference relation according to a condition of Equation 1 below.

$$\Psi_{\{1|2\}} + \Psi_{\{2|1\}} > \frac{1}{2}(\Psi_{\{1\}} + \Psi_{\{2\}}) \quad \text{Equation 1}$$

$$\Psi_{\{1|2\}} = \log_2\left(1 + \frac{P_{(1,1)}}{N + P_{(1,2)}}\right) \Psi_{\{2|1\}} = \log_2\left(1 + \frac{P_{(2,2)}}{N + P_{(2,1)}}\right)$$

$$\Psi_{\{1\}} = \log_2\left(1 + \frac{P_{(1,1)}}{N}\right) \Psi_{\{2\}} = \log_2\left(1 + \frac{P_{(2,2)}}{N}\right)$$

In Equation 1, $\Psi_{\{x|y\}}$ signifies available capacity of link #x when link #x and link #y simultaneously use a resource, $\Psi_{\{x\}}$ signifies available capacity of link #x when link #x uses a resource by itself, N signifies noise power, $P_{(x,y)}$ signifies power with which a signal transmitted for link #y is received by a STA related to link #x, and $P_{(x,x)}$ signifies power with which a signal transmitted for link #x is received by a STA related to link #x.

Specifically, by using channel information, an interference relation may be determined according to whether it is more advantageous to allocate an identical resource, or whether it is more advantageous that a resource is not simultaneously used but exclusively allocated, from the viewpoint of entire network throughput although two links interfering with each other exist.

When duration information is provided which represents a time length during which a link giving interference is maintained, network topology information may be managed as follows.

When the message illustrated in FIG. 5 or FIG. 6 is used, the PCP may collect duration information of an adjacent link. In other words, the PCP may recognize how long a time period, during which an adjacent link interferes with a relevant STA, is. Accordingly, the PCP may update an interference link list after a time period indicated by the duration information elapses.

Figure 7:
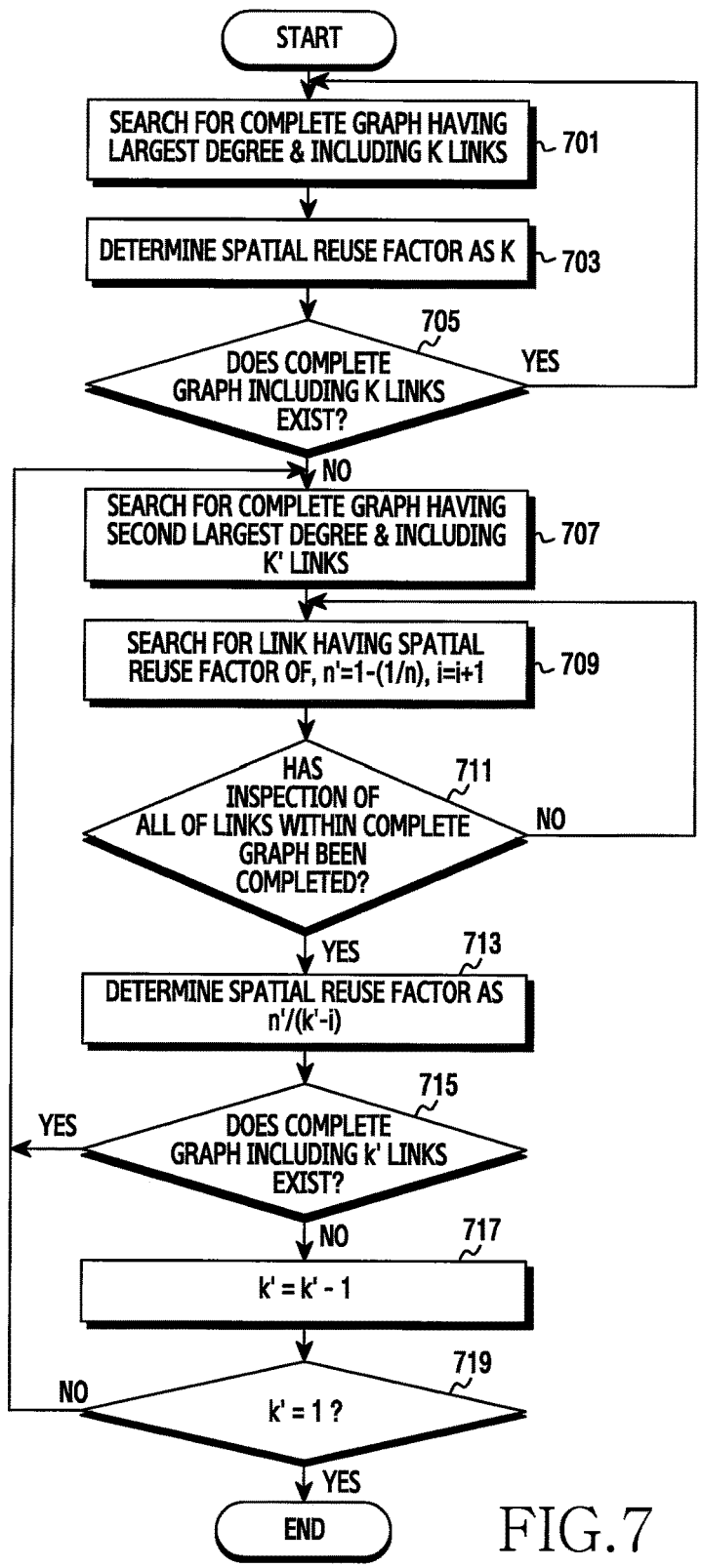
FIG. 7 illustrates a procedure for determining a spatial reuse factor in a wireless communication system according to an embodiment of the present invention.

A process for determining a spatial reuse factor is as follows. FIG. 7 illustrates a procedure for determining a spatial reuse factor in a wireless communication system according to still another embodiment of the present invention.

Referring to FIG. 7, after a PCP generates an interference graph, in step 701, the PCP searches for a complete graph having the largest degree. When k represents the number of links included in the complete graph having the highest degree, the PCP proceeds to step 703, and determines that a spatial reuse factor of each link is k. Then, the PCP proceeds to step 705, and determines whether a complete graph including a k number of links further exists. When the complete graph including the k number of links further exists, the PCP returns to step 701.

In contrast, when the complete graph including the k number of links does not further exist, the PCP proceeds to step 707, and searches for a complete graph having a degree, which is less than k and is equal to k', among subgraphs of the interference graph. Then, the PCP proceeds to step 709. In step 709, when a link having an already-determined spatial reuse factor exists among links included in the found complete graph, the PCP subtracts, from 1, the value of a reciprocal of the spatial reuse factor of the relevant link, and increases, by 1, the number i of links having already-determined spatial reuse factors. Then, the PCP proceeds to step 711, and determines whether the inspection of all of the links within the complete graph has been completed. When the inspection of all of the links has not been completed, the PCP repeats step 709. In contrast, when the inspection of all of the links has been completed, the PCP proceeds to step 713, and determines that a value obtained by dividing a result of the subtraction in step 709 by the number i of links, of which spatial reuse factors are not determined, is values of spatial reuse factors of the remaining links. Then, the PCP proceeds to step 715, and determines whether a complete graph including a k number of links further exists. When the complete graph including the k number of links further exists, the PCP returns to step 707.

In contrast, when the complete graph including the k number of links does not further exist, the PCP proceeds to step 717, and reduces k' by 1. Then, the PCP proceeds to step 719, and determines whether k' is equal to 1. When k' is not equal to 1, the PCP returns to step 707. Specifically, the PCP repeats steps 707 to 715 until k' becomes 1, and thereby determines spatial reuse factors of all of the links. In other words, the PCP determines a ratio of a resource, that each link is capable of using in all of the resources, over all of the resources.

Scheduling which allocates an identical resource to multiple users may be performed as follows. When a spatial reuse factor of each link is determined, the PCP may sequentially allocate a resource to each link in a ratio as large as a spatial reuse factor among all of the available resources, starting from links included in a complete graph having a higher degree. At this time, the PCP may allocate an identical resource to links belonging to different complete graphs.

Figure 8:
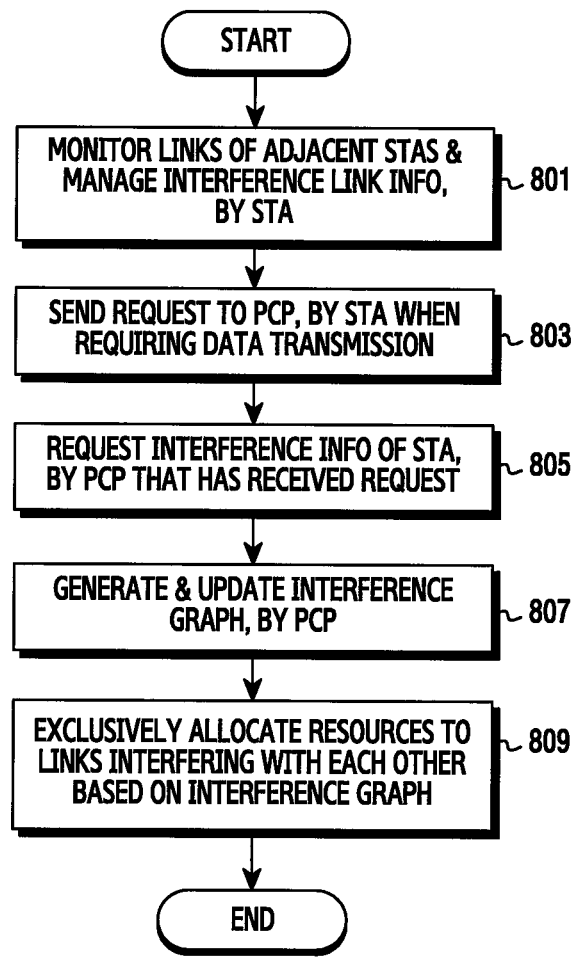
FIG. 8 illustrates a procedure for analyzing a network topology and scheduling in a wireless communication system according to an embodiment of the present invention.

FIG. 8 illustrates a procedure for analyzing a network topology and scheduling in a wireless communication system according to an embodiment of the present invention.

Referring to FIG. 8, in step 801, each of STAs monitors links of an adjacent STA, and manages interference link information. For example, the interference link information may a NAV timer. The monitoring of the links of the adjacent STAs may be performed by detecting packets transmitted by the adjacent STAs. Also, in order to manage the interference link information, each of the STAs confirms a source address, a destination address, and duration information of another link.

In step 803, a STA, that needs to transmit data, sends a request for resource allocation, to a PCP. For example, the resource allocation may be the allocation of an SP. According to an embodiment of the present invention, the request may require only the resource allocation. According to another embodiment of the present invention, the request may further include adjacent link information.

In step 805, the PCP, that has received the request from the STA, requests adjacent link information of the STA. The adjacent link information signifies information required to recognize a network topology, namely, an interference relation between respective links. At this time, the required information includes information that the STAs have confirmed in order to manage the interference link information. According to another embodiment of the present invention, the PCP may also send a request for the adjacent link information, to a counterpart STA (i.e., a destination STA) of the STA that has transmitted the request. For example, the adjacent link information may include at least one of the items illustrated in FIG. 4, FIG. 5, and FIG. 6.

In step 807, the PCP generates and updates an interference graph on the basis of the adjacent link information received from the STA. When an already-generated interference graph does not exist, the PCP generates an interference graph. In contrast, when the already-generated interference graph exists, the PCP updates the interference graph. The update of the interference graph includes at least one of the addition or deletion of a vertex representing a link, and the addition or deletion of an edge representing an interference relation. In this regard, the PCP may generate and update the interference link list shown in Table 1, instead of the interference graph.

In step 809, the PCP performs scheduling on the basis of the interference graph. In other words, the PCP allocates an identical resource to links which do not interfere with each other. Also, the PCP may determine a spatial reuse factor of each link, and may sequentially allocate a resource to each link in a ratio as large as a spatial reuse factor among all of the available resources, starting from links included in a complete graph having a higher degree.

Figure 9:
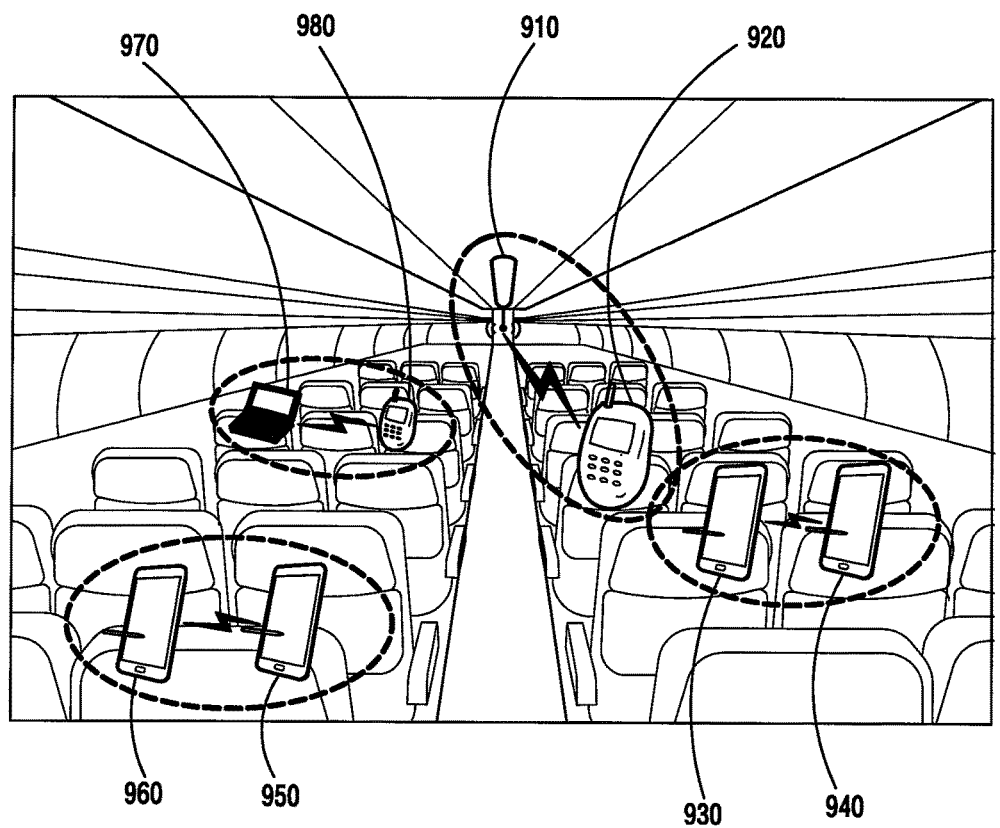
FIG. 9 illustrates an example of a wireless communication system according to an embodiment of the present invention.

FIG. 9 illustrates an example of a wireless communication system according to an embodiment of the present invention. FIG. 9 illustrates an example of a wireless network environment, to which an embodiment of the present invention is applied. FIG. 9 illustrates a wireless network within an airplane. As illustrated in FIG. 9, an Access Point (AP) 910 is installed within the airplane, and the AP 910 and multiple user devices 920, 930, 940, 950, 960, 970, and 980 that passengers have may form the wireless network. Although only one AP 910 is illustrated in FIG. 9, an embodiment of the present invention may be performed even in an environment where multiple APs are installed.

Figure 10:
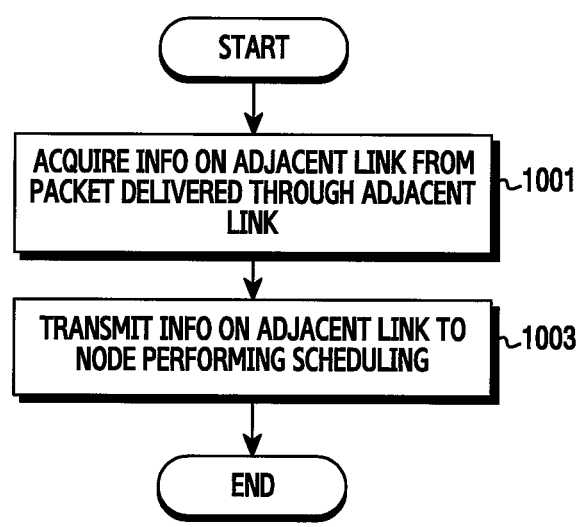
FIG. 10 illustrates an operation procedure of a node that performs wireless communication in a wireless communication system according to an embodiment of the present invention.

FIG. 10 illustrates an operation procedure of a node that performs wireless communication in a wireless communication system according to an embodiment of the present invention.

Referring to FIG. 10, in step 1001, the node acquires information on an adjacent link from a packet delivered over the adjacent link. The packet delivered over the adjacent link is a packet which does not have the node as a source or a destination, and signifies a packet, of which a destination is another node different from the node. In other words, the node may decode a packet, which does not have the node as a source or a destination, in order to acquire the information on the adjacent link, which delivers the packet, from the packet. Here, the packet is included in a signal which is not a signal for measurement and is used to transmit data between a source of the adjacent link and a destination thereof. Specifically, the packet serves as interference to a link of the node. In other words, when a signal of another link is detected, the node acquires information included in said another packet by decoding the signal. For example, the information includes at least one of a source address, a destination address, and a duration. Further, according to an embodiment of the present invention, the node may measure a channel quality of a signal of the adjacent link. For example, the channel quality includes at least one of a Received Signal Strength (RSS), a Carrier to Interference and Noise Ratio (CINR), a Signal to Interference and Noise Ratio (SINR), and a Signal to Noise Ratio (SNR) of the signal of the adjacent link.

Thereafter, the node proceeds to step 1003, and transmits the information on the adjacent link to a control node that performs scheduling. According to an embodiment of the present invention, the information on the adjacent link may be transmitted when the node requests resource allocation. Specifically, the node may transmit the information on the adjacent link simultaneously with the request for resource allocation, or according to a request of the control node that performs the scheduling. According to another embodiment of the present invention, the information on the adjacent link may be periodically transmitted. According to still another embodiment of the present invention, the information on the adjacent link may be transmitted when the information on the adjacent link is changed. The information on the adjacent link may include at least one of the number of adjacent links, source addresses of the respective adjacent links, destination addresses thereof, durations thereof, and channel qualities thereof.

Although not illustrated in FIG. 10, the node may receive scheduling information from the control node. The scheduling information may include a result of the resource allocation, and the resource allocation may be performed in view of an interference relation determined based on the information on the adjacent link.

Figure 11:
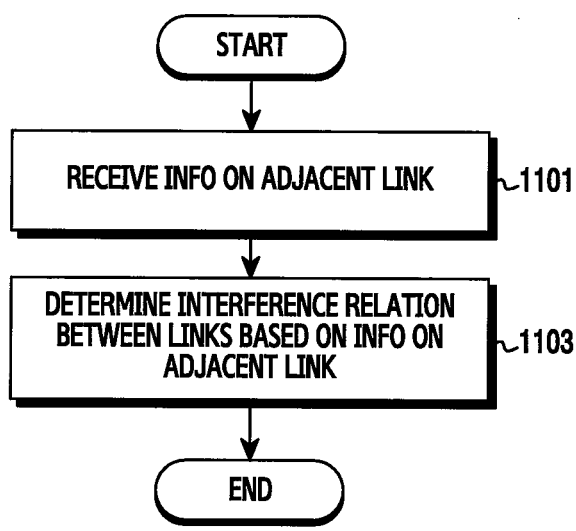
FIG. 11 illustrates an operation procedure of a node that performs scheduling in a wireless communication system according to an embodiment of the present invention.

FIG. 11 illustrates an operation procedure of a node that performs scheduling in a wireless communication system according to an embodiment of the present invention.

Referring to FIG. 11, in step 1101, the node receives information on an adjacent link of another node in a network. According to an embodiment of the present invention, the information on the adjacent link may be transmitted when said another node requests resource allocation. Specifically, the node may receive the information on the adjacent link simultaneously with the request for the resource allocation, or as a response to a request after the node sends the request to said another node that has requested the resource. According to another embodiment of the present invention, the information on the adjacent link may be periodically received. According to still another embodiment of the present invention, the information on the adjacent link may be received when the information on the adjacent link is changed. The information on the adjacent link may include at least one of the number of adjacent links, source addresses of the respective adjacent links, destination addresses thereof, durations thereof, and channel qualities thereof.

Then, the node proceeds to step 1103, and determines an interference relation between links in the network on the basis of the information on the adjacent link. The interference relation signifies links which interfere with each other and may not be allocated an identical resource. Specifically, the node determines at least one link pair which has an interference relation among all link pairs in the network. According to an embodiment of the present invention, the node may determine that an interference relation is established between a link, that the information on the adjacent link has notified of as an adjacent link, and a link of a node, that has transmitted the information on the adjacent link. According to another embodiment of the present invention, when the channel quality of a signal of the adjacent link is collected through the information on the adjacent link, the node may determine an interference relation on the basis of a throughput of the entire network in a case where an identical resource is allocated. For example, even in the case of the link that the information on the adjacent link has notified of as an adjacent link, the node may predict and calculate a first capacity in a case where an identical resource is allocated, and a second capacity in a case where different resources are allocated, on the basis of the channel quality, and then may not determine that the link has an interference relation when the first capacity is larger than the second capacity. As a specific example, even in the case of the link that the information on the adjacent link has notified of as an adjacent link, the node may not determine that the link has an interference relation when the sum of capacities of the respective links in a case where an identical resource is allocated is larger than the average of capacities of the respective links in a case where different resources are allocated.

Thereafter, although not illustrated in FIG. 11, when duration information of the adjacent link is collected through the information on the adjacent link, the node may update the interference relation on the basis of the duration information. The duration information signifies a time length during which the relevant adjacent link is maintained. Accordingly, when a time period indicated by the duration information elapses, the node may determine that the relevant adjacent link is subjected to extinction, and may delete an interference relation with the link subjected to the extinction.

Also, although not illustrated in FIG. 11, the node may allocate resources to links in the network on the basis of the interference relation. In other words, the node may perform scheduling using a spatial reuse scheme on the basis of the interference relation. For example, the node determines a spatial reuse factor of each link on the basis of the interference information, and determines a set of links capable of being allocated an identical resource. Specifically, the node allocates resources to links included in a set of links having the highest spatial reuse factor, in which the allocation of resources to the links are mutually exclusive, and allocates all or some of the resources, which are allocated to the links, in an overlapping manner to another link which does not mutually interfere with the relevant link. In other words, the node allocates an identical resource to links which do not interfere with each other.

According to the above-described various embodiments of the present invention, the STA collects adjacent link information by using a packet, which is delivered through a link between the other STAs, and provides the adjacent link information to the PCP. Accordingly, the PCP may recognize an interference relation in the network.

According to another embodiment of the present invention, beams that the respective STA can use may be further considered. When the STAs perform beamforming, an interference relation may depend on a direction of a used beam. Accordingly, the adjacent link information may further include information on a beam that a STA uses, or information on beams that the STA can use, and the adjacent link information may depend on a change of a beam. Further, the PCP may change the allocation of a beam to each STA, and thereby may reconfigure the interference relation. When the adjacent link information further includes information on a beam, a message providing the adjacent link information may be configured as illustrated in FIG. 12 or FIG. 13.

FIG. 12 illustrates a configuration example of a message providing adjacent link information in a wireless communication system according to still another embodiment of the present invention. Referring to FIG. 12, the message includes an ID 1201 representing identification information of the message, a length 1203 representing the size of the message, the number 1211 of available beams representing the number of beams capable of being used by a STA transmitting the message, beam indices 1213-1 to 1213-N, and pieces of measurement information 1217-1 to 1217-N corresponding to the respective beam indices. Each of the pieces of measurement information 1217-1 to 1217-N includes at least one piece of information on an adjacent link, from which energy is detected when a beam corresponding to a beam index is used. For example, measurement information #1 1217-1 includes information on an adjacent link measured when beam #1 is used. Specifically, each of the pieces of measurement information 1217-1 to 1217-N may include at least one of the number of links representing the number of adjacent links from which energy is detected, a source address of at least one adjacent link, a destination address of the at least one adjacent link, a duration of the at least one adjacent link, and the degree of interference (e.g., an RSSI) of the at least one adjacent link.

FIG. 13 illustrates a configuration example of a message providing adjacent link information in a wireless communication system according to yet another embodiment of the present invention. Referring to FIG. 13, the message includes an ID 1301 representing identification information of the message, a length 1303 representing the size of the message, information 1321 on a beam being used which represents a beam index being used by a STA transmitting the message, the number 1323 of alternative beams representing the number of at least one alternative beam capable of maintaining a link of the STA transmitting the message, beam identification information 1325 representing the at least one alternative beam, and measurement information 1327 corresponding to the beam being used. For example, the beam identification information 1325 may include at least one of at least one beam index and a bitmap indicating an alternative beam. The size of the bitmap is greater than or equal to the number of all available beams, and at least one bit corresponding to the alternative beam in the bitmap may be set to a positive value (e.g., 1). The measurement information 1327 may include at least one of the number of links representing the number of adjacent links from which energy is detected, a source address of at least one adjacent link, a destination address of the at least one adjacent link, a duration of the at least one adjacent link, and the degree of interference (e.g., an RSSI) of the at least one adjacent link.

In the configuration example of the message illustrated in FIG. 13, the message includes the information 1321 on the beam being used, the number 1323 of alternative beams, and the beam identification information 1325. However, according to another embodiment of the present invention, the beam identification information 1325 may be omitted. In this case, a PCP may know how many times a relevant STA is capable of changing a beam, on the basis of the number 1323 of alternative beams, and may know a beam that the relevant STA has used, on the basis of the information 1321 on the beam being used. Alternatively, according to another embodiment of the present invention, the number 1323 of alternative beams may be omitted. In this case, the PCP may know a beam that the relevant STA has used, on the basis of the information 1321 on the beam being used, and may know indices of and the number of other beams available in the relevant STA, on the basis of the beam identification information 1325. Therefore, even in any of the embodiments, the PCP may generate multiple interference graphs of combinations of beams by the STAs.

Through the message exemplified in FIG. 12 or FIG. 13, each STA may provide the PCP with information on an adjacent link which interferes with a beam being used by each STA. Accordingly, the PCP may recognize a link which interferes with each STA in the network, on the basis of the measurement information included in the message.

Figure 14:
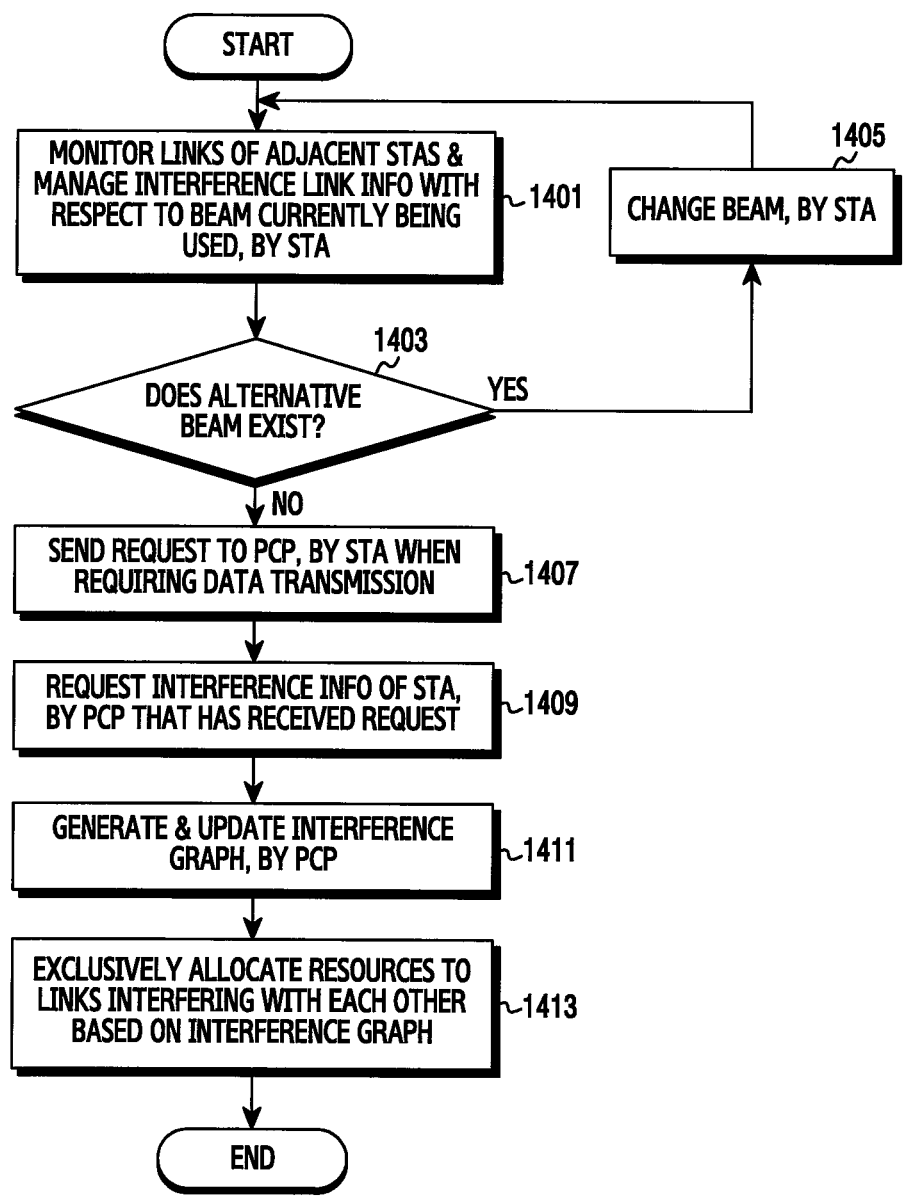
FIG. 14 illustrates a procedure for analyzing a network topology and scheduling in a wireless communication system according to another embodiment of the present invention.

FIG. 14 illustrates a procedure for analyzing a network topology and scheduling in a wireless communication system according to another embodiment of the present invention.

Referring to FIG. 14, in step 1401, with respect to a beam currently being used by each STA, each STA monitors links of an adjacent STA, and manages interference link information. For example, the interference link information may include a NAV timer. The monitoring of the links of the adjacent STA may be performed by detecting a packet transmitted by the adjacent STAs. Also, in order to manage the interference link information, each STA may confirm a source address, a destination address, duration information, a signal strength, and the like of another link.

In step 1403, each STA determines whether an alternative beam exists. In other words, each STA determines whether another available beam exists while maintaining a link of each STA. In order to maintain the link, directions of beams need to coincide with each other between two STAs. At this time, the width of a beam, an effect of a reflected wave, and the like may cause not only one beam but also multiple beams to maintain a link.

When the alternative beam exists, in step 1405, at least one of the STAs changes a beam, which is being used, to another alternative beam. Due to the change, an interference relation may be changed. Then, in step 1401, each STA monitors links of the adjacent STA and manages the interference link information, according to the changed interference relation. Due to step 1401 to step 1405, the STAs may generate pieces of adjacent link information representing various interference relations corresponding to combinations of alternative beams. At this time, the PCP may control the beam change in order to effectively change the interference relation.

When the alternative beam does not exist, in step 1407, the STA, that needs to transmit data, sends a request for resource allocation to the PCP. For example, the resource allocation may be the allocation of an SP. According to an embodiment of the present invention, the request may require only the resource allocation. According to another embodiment of the present invention, the request may further include adjacent link information.

In step 1409, the PCP, that has received the request from the STA, requests adjacent link information of the STA. The adjacent link information of the STA signifies information required to recognize a network topology, namely, an interference relation between respective links. At this time, the required information includes information that the STAs have confirmed in order to manage the interference link information. According to another embodiment of the present invention, the PCP may also send a request for the adjacent link information, to a counterpart STA (i.e., a destination STA) of the STA that has transmitted the request. For example, the adjacent link information may include at least one of the items illustrated in FIG. 12.

In step 1411, the PCP generates and updates an interference graph on the basis of the adjacent link information received from the STA. When an already-generated interference graph does not exist, the PCP generates an interference graph. In contrast, when the already-generated interference graph exists, the PCP updates the interference graph. The update of the interference graph includes at least one of the addition or deletion of a vertex representing a link, and the addition or deletion of an edge representing an interference relation. The interference relation may depend on combinations of beams used by the STAs. Accordingly, the PCP may generate or update interference graphs of multiple combinations of beams. In this regard, the PCP may generate and update the interference link list shown in Table 1, instead of the interference graph.

In step 1413, the PCP performs scheduling on the basis of the interference graph. In other words, the PCP allocates an identical resource to links which do not interfere with each other. Also, the PCP may determine a spatial reuse factor of each link, and may sequentially allocate a resource to each link in a ratio as large as a spatial reuse factor among all of the available resources, starting from links included in a complete graph having a higher degree. At this time, when multiple interference graphs corresponding to the multiple combinations of beams are generated, the PCP may select an optimal interference graph, and may then perform the scheduling. For example, the PCP may select an interference graph having the highest resource efficiency. The resource efficiency may be determined based on various criteria, and as an example, may be determined based on a spatial reuse factor.

In the embodiment illustrated in FIG. 14, when the alternative beam does not exist, namely, after adjacent link information is generated for all combinations of beams, step 1407 is performed. However, according to another embodiment of the present invention, step 1407 may be performed before the adjacent link information is generated for all the combinations of beams.

Figure 15:
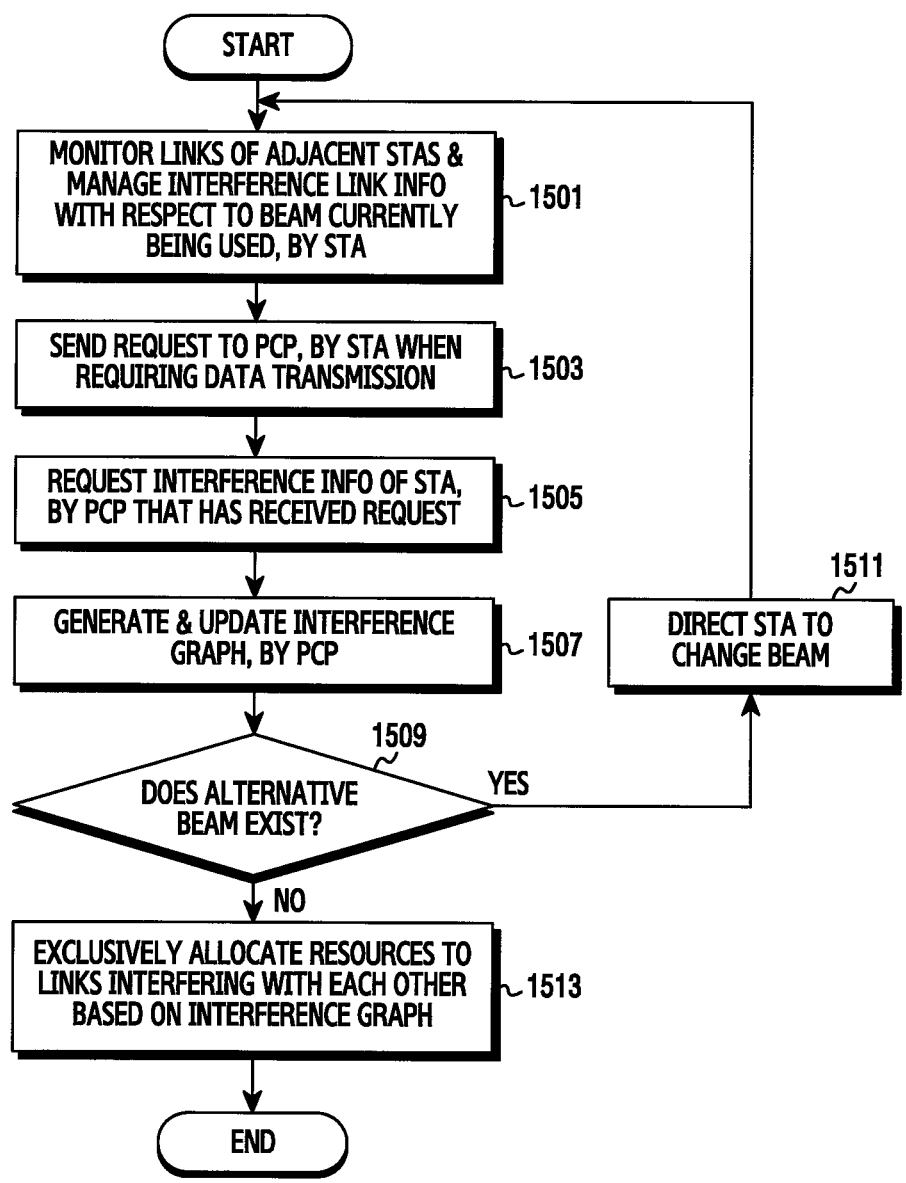
FIG. 15 illustrates a procedure for analyzing a network topology and scheduling in a wireless communication system according to still another embodiment of the present invention.

FIG. 15 illustrates a procedure for analyzing a network topology and scheduling in a wireless communication system according to still another embodiment of the present invention.

Referring to FIG. 15, in step 1501, with respect to a beam currently being used by each STA, each STA monitors links of an adjacent STA, and manages interference link information. For example, the interference link information may include a NAV timer. The monitoring of the links of the adjacent STA may be performed by detecting a packet transmitted by the adjacent STAs. Also, in order to manage the interference link information, each STA may confirm a source address, a destination address, duration information, a signal strength, and the like of another link.

In step 1503, a STA, that needs to transmit data, sends a request for resource allocation, to a PCP. For example, the resource allocation may be the allocation of an SP. According to an embodiment of the present invention, the request may require only the resource allocation. According to another embodiment of the present invention, the request may further include adjacent link information.

In step 1505, the PCP, that has received the request from the STA, requests adjacent link information of the STA. The adjacent link information signifies information required to recognize a network topology, namely, an interference relation between respective links. At this time, the required information includes information that the STAs have confirmed in order to manage the interference link information. According to another embodiment of the present invention, the PCP may also send a request for the adjacent link information, to a counterpart STA (i.e., a destination STA) of the STA that has transmitted the request. For example, the adjacent link information may include at least one of the items illustrated in FIG. 13.

In step 1507, the PCP generates and updates an interference graph on the basis of the adjacent link information received from the STA. When an already-generated interference graph does not exist, the PCP generates an interference graph. In contrast, when the already-generated interference graph exists, the PCP updates the interference graph. The update of the interference graph includes at least one of the addition or deletion of a vertex representing a link, and the addition or deletion of an edge representing an interference relation. The interference relation may depend on combinations of beams used by the STAs. Accordingly, the PCP may generate or update interference graphs of multiple combinations of beams through the repeated procedure due to step 1509 and step 1511. In this regard, the PCP may generate and update the interference link list shown in Table 1, instead of the interference graph.

In step 1509, the PCP determines whether an alternative beam exists. In other words, the PCP determines whether another available beam exists while each STA maintains a link thereof. Whether the available beam exists may be determined based on the adjacent link information received from each STA. In order to maintain the link, directions of beams need to coincide with each other between two STAs. At this time, the width of a beam, an effect of a reflected wave, and the like may cause not only one beam but also multiple beams to maintain a link.

When the alternative beam exists, in step 1511, at least one of the STAs is controlled to change a beam, which is being used, to another alternative beam. To this end, the PCP may transmit, to the at least one STA, a message which directs the STA to change a beam. Due to the change, an interference relation may be changed. Then, in step 1501, each STA monitors links of the adjacent STA and manages the interference link information, according to the changed interference relation. Through the repeated procedure due to step 1509 and step 1511, the STAs may generate pieces of adjacent link information representing various interference relations corresponding to combinations of alternative beams.

When the alternative beam does not exist, in step 1513, the PCP performs scheduling on the basis of the interference graph. In other words, the PCP allocates an identical resource to links which do not interfere with each other. Also, the PCP may determine a spatial reuse factor of each link, and may sequentially allocate a resource to each link in a ratio as large as a spatial reuse factor among all of the available resources, starting from links included in a complete graph having a higher degree. At this time, when multiple interference graphs corresponding to the multiple combinations of beams are generated, the PCP may select an optimal interference graph, and may then perform the scheduling. For example, the PCP may select an interference graph having the highest resource efficiency. The resource efficiency may be determined based on various criteria, and as an example, may be determined based on a spatial reuse factor.

In the embodiment illustrated in FIG. 15, when the alternative beam does not exist, namely, after adjacent link information is generated for all combinations of beams, step 1513 is performed. However, according to another embodiment of the present invention, step 1513 may be performed before the adjacent link information is generated for all the combinations of beams.

In the embodiment illustrated in FIG. 15, the optimal interference graph is selected in step 1513. However, according to another embodiment of the present invention, the optimal interference graph may be selected in step 1507. Specifically, the PCP may receive adjacent link information on a new beam combination, may generate an interference graph corresponding to the new beam combination, and may then compare the generated interference graph with an interference graph corresponding to a previous beam combination. When a result of the comparison shows that the interference graph corresponding to the new beam combination has higher resource efficiency, the PCP may update the interference graph to the interference graph corresponding to the new beam combination. In contrast, when the interference graph corresponding to the previous beam combination has higher resource efficiency, the PCP may maintain the existing interference graph.

Figure 16:
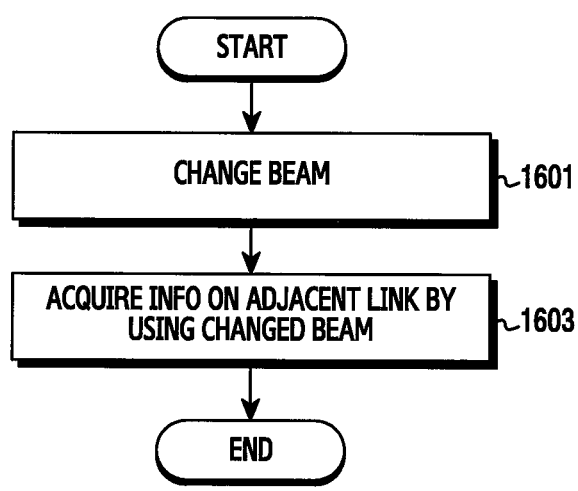
FIG. 16 illustrates an operation procedure of a node that performs wireless communication in a wireless communication system according to another embodiment of the present invention.

FIG. 16 illustrates an operation procedure of a node that performs wireless communication in a wireless communication system according to another embodiment of the present invention.

Referring to FIG. 16, in step 1601, the node changes a beam being used. The changed beam is one of beams capable of maintaining a link of the node. The beam change may be performed according to a determination by the node or control by a node that performs scheduling.

Then, the node proceeds to step 1603, and acquires information on an adjacent link from a packet, which is delivered over the adjacent link, on the basis of a signal received by using the changed beam. The packet delivered over the adjacent link signifies a packet which does not have the node as a source or a destination. Here, the packet is included in a signal which is not a signal for measurement and is used to transmit data between a source of the adjacent link and a destination thereof. Specifically, the packet serves as interference to a link of the node. In other words, when a signal of another link is detected, the node acquires information included in said another packet by decoding the signal. For example, the information includes at least one of a source address, a destination address, and a duration. Further, according to an embodiment of the present invention, the node may measure a channel quality of a signal of the adjacent link.

Thereafter, although not illustrated in FIG. 16, the node may provide the information on the adjacent link to another node that performs scheduling. At this time, the information on the adjacent link may include at least one of the items illustrated in FIG. 12 or FIG. 13. Specifically, the information on the adjacent link may include at least one of the number of adjacent links, information indicating a beam being used, the number of at least one beam capable of replacing the beam being used, identification information of the at least one beam capable of replacing the beam being used, and measurement information on the at least one beam. Here, the measurement information may include at least one of source addresses of respective adjacent links, destination addresses thereof, durations thereof, and channel qualities thereof.

Figure 17:
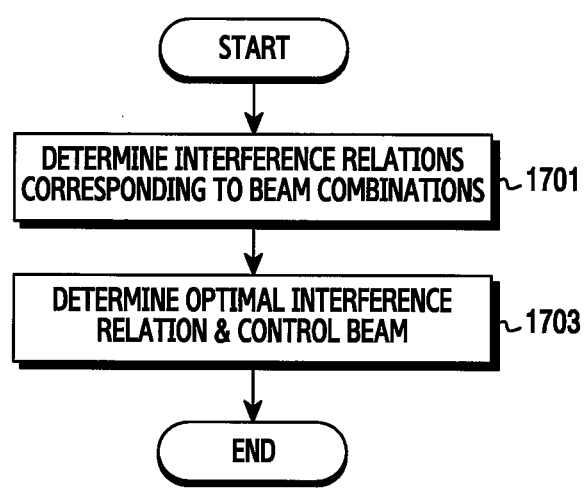
FIG. 17 illustrates an operation procedure of a node that performs scheduling in a wireless communication system according to another embodiment of the present invention.

FIG. 17 illustrates an operation procedure of a node that performs scheduling in a wireless communication system according to another embodiment of the present invention.

Referring to FIG. 17, in step 1701, the node determines at least one interference relation corresponding to at least one beam combination of other nodes in a network. To this end, the node may receive a message including adjacent link information on multiple available beams. Alternatively, the node may direct each of the other nodes to change a beam, and may control each of the other nodes to repeatedly report adjacent link information measured by using the changed beam. At this time, the information on the adjacent link may include at least one of the items illustrated in FIG. 12 or FIG. 13. The at least one interference relation may be determined together after adjacent link information for each beam is received, or may be sequentially determined at each reception in the process of repeatedly receiving adjacent link information.

Thereafter, the node proceeds to step 1703, and determines an optimal interference relation among the at least one interference relation. Then, the node controls beams of the other nodes to form the optimal interference relation. For example, the node may select an interference graph having the highest resource efficiency. The resource efficiency may be determined based on various criteria, and as an example, may be determined based on a spatial reuse factor. According to another embodiment of the present invention, the optimal interference step may be determined together in the process of determining the interference relation in step 1701.

Thereafter, although not illustrated in FIG. 17, the node may change beam allocation for the other nodes so as to use a beam combination corresponding to the optimal interference relation. Specifically, the node may transmit a message, which directs the other nodes to use a beam belonging to the beam combination, to the other nodes. The message may further include information on resource allocation.

Figure 18:
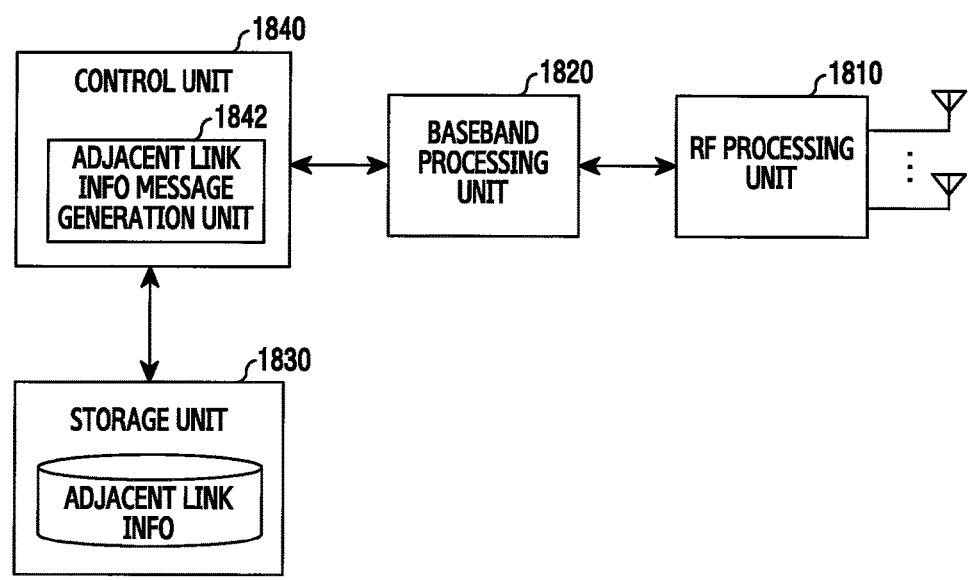
FIG. 18 illustrates a block configuration of a node that performs wireless communication in a wireless communication system according to an embodiment of the present invention.

FIG. 18 illustrates a block configuration of a node that performs wireless communication in a wireless communication system according to an embodiment of the present invention.

Referring to FIG. 18, the node includes a Radio Frequency (RF) processing unit 1810, a baseband processing unit 1820, a storage unit 1830, and a control unit 1840.

The RF processing unit 1810 performs functions for transmitting and receiving signals through a wireless channel, such as band conversion of a signal, amplification thereof, and the like. Specifically, the RF processing unit 1810 up-converts a baseband signal, which is provided by the baseband processing unit 1820, to an RF band signal, and then transmits the RF band signal through an antenna. The RF processing unit 1810 down-converts an RF band signal, which is received through the antenna, to a baseband signal. For example, the RF processing unit 1810 may include a transmission filter, a reception filter, an amplifier, a mixer, an oscillator, a Digital-to-Analog Converter (DAC), an Analog-to-Digital Converter (ADC), and the like. The RF processing unit 1810 may include multiple antennas or an array antenna, and may perform beamforming by using the multiple antennas or the array antenna.

The baseband processing unit 1820 performs a function of conversion between a baseband signal and a bit stream according to a physical layer standard of a system. For example, when data is transmitted, the baseband processing unit 1820 generates complex symbols by encoding and modulating a transmission bit stream. Also, when data is received, the baseband processing unit 1820 reconstructs a reception bit stream by demodulating and decoding a baseband signal provided by the RF processing unit 1810. For example, when an Orthogonal Frequency Division Multiplexing (OFDM) scheme is followed, during data transmission, the baseband processing unit 1820 generates complex symbols by encoding and modulating a transmission bit stream, maps the complex symbols to subcarriers, and constructs OFDM symbols through an Inverse Fast Fourier Transform (IFFT) operation and Cyclic Prefix (CP) insertion. Further, when data is received, the baseband processing unit 1820 divides, in a unit of OFDM symbol, a baseband signal provided by the RF processing unit 1810, reconstructs signals mapped to subcarriers through a Fast Fourier Transform (FFT) operation, and reconstructs a reception bit stream through demodulation and decoding. The baseband processing unit 1820 and the RF processing unit 1810 transmit and receive signals as described above. Accordingly, the baseband processing unit 1820 and the RF processing unit 1810 may be referred to as a "transmission unit" and a "reception unit" or a "transmission/reception unit."

The storage unit 1830 stores data, such as a basic program, an application program, configuration information, and the like for an operation of the node. Particularly, the storage unit 1830 stores information on an adjacent link. The information on the adjacent link may include at least one of the number of adjacent links, source addresses of the respective adjacent links, destination addresses thereof, durations thereof, and channel qualities thereof. Also, the storage unit 1830 provides the stored data according to a request of the control unit 1840.

The control unit 1840 controls overall operations of the base station. For example, the control unit 1840 transmits and receives signals through the baseband processing unit 1820 and the RF processing unit 1810. According to an embodiment of the present invention, the control unit 1840 acquires the information on the adjacent link, and includes an adjacent link information message generation unit 1842 that generates a message including the information on the adjacent link. For example, the control unit 1840 controls the node to perform the procedures illustrated in FIG. 8, FIG. 10, FIG. 14, and FIG. 16. An operation of the control unit 1840 according to an embodiment of the present invention is as follows.

According to an embodiment of the present invention, the control unit 1840 acquires information on an adjacent link through a packet, of which a destination is another node different from the node, through the adjacent link. Specifically, when a signal of another link is detected, the control unit 1840 acquires information included in said another packet by decoding the signal. Further, according to another embodiment of the present invention, the control unit 1840 may measure a channel quality of a signal of the adjacent link. Thereafter, the control unit 1840 generates a message including the information on the adjacent link, and transmits the message to a node that performs scheduling. The message may include at least one of the number of adjacent links, source addresses of the respective adjacent links, destination addresses thereof, durations thereof, and channel qualities thereof.

At this time, the control unit 1840 may generate measurement information, which includes the number of the adjacent links and the like, for each available beam of the node. Specifically, the control unit 1840 may acquire measurement information for each beam by detecting and decoding a signal of another link for each of the multiple available beams. Accordingly, the message may include information on an adjacent link for each beam, or may further include information on an available beam (e.g., the number of beams, beam identification information, etc.).

Figure 19:
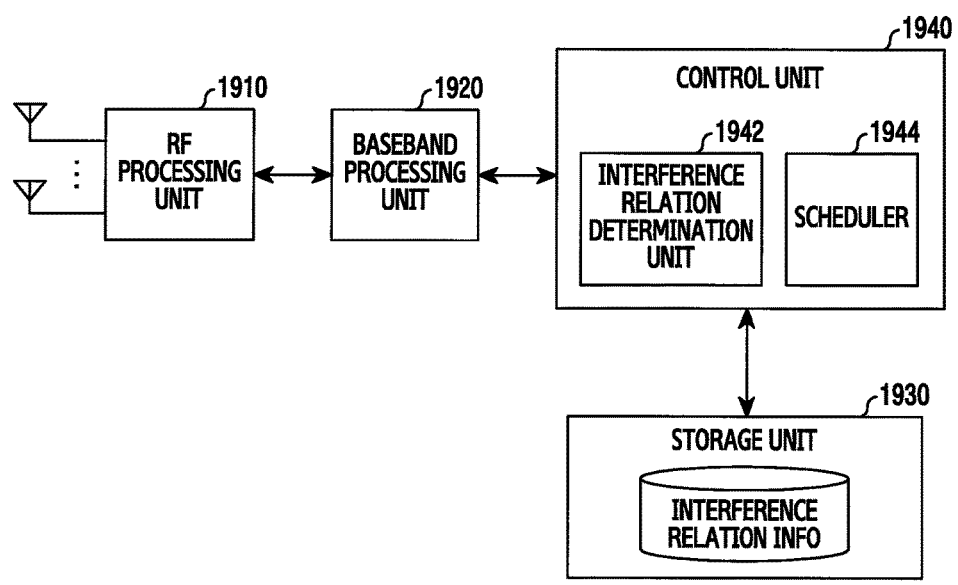
FIG. 19 illustrates a block configuration of a node that performs scheduling in a wireless communication system according to an embodiment of the present invention.

FIG. 19 illustrates a block configuration of a node that performs scheduling in a wireless communication system according to an embodiment of the present invention.

Referring to FIG. 19, the node includes an RF processing unit 1910, a baseband processing unit 1920, a storage unit 1930, and a control unit 1940.

The RF processing unit 1910 performs functions for transmitting and receiving signals through a wireless channel, such as band conversion of a signal, amplification thereof, and the like. Specifically, the RF processing unit 1910 up-converts a baseband signal, which is provided by the baseband processing unit 1920, to an RF band signal, and then transmits the RF band signal through an antenna. The RF processing unit 1910 down-converts an RF band signal, which is received through the antenna, to a baseband signal. For example, the RF processing unit 1910 may include a transmission filter, a reception filter, an amplifier, a mixer, an oscillator, a DAC, an ADC, and the like. The RF processing unit 1910 may include multiple antennas or an array antenna, and may perform beamforming by using the multiple' antennas or the array antenna.

The baseband processing unit 1920 performs a function of conversion between a baseband signal and a bit stream according to a physical layer standard of a system. For example, when data is transmitted, the baseband processing unit 1920 generates complex symbols by encoding and modulating a transmission bit stream. Also, when data is received, the baseband processing unit 1920 reconstructs a reception bit stream by demodulating and decoding a baseband signal provided by the RF processing unit 1910. For example, when an OFDM scheme is followed, during data transmission, the baseband processing unit 1920 generates complex symbols by encoding and modulating a transmission bit stream, maps the complex symbols to subcarriers, and constructs OFDM symbols through an IFFT operation and CP insertion. Further, when data is received, the baseband processing unit 1920 divides, in a unit of OFDM symbol, a baseband signal provided by the RF processing unit 1910, reconstructs signals mapped to subcarriers through an FFT operation, and reconstructs a reception bit stream through demodulation and decoding. The baseband processing unit 1920 and the RF processing unit 1910 transmit and receive signals as described above. Accordingly, the baseband processing unit 1920 and the RF processing unit 1910 may be referred to as a "transmission unit" and a "reception unit" or a "transmission/reception unit."

The storage unit 1930 stores data, such as a basic program, an application program, configuration information, and the like for an operation of the node. Particularly, the storage unit 1930 stores information on an interference relation determined based on information collected from other nodes. The interference relation signifies links which interfere with each other and may not be allocated an identical resource. Specifically, the interference relation represents at least one link pair which has a mutual interference relation among all link pairs in the network. Also, the storage unit 1930 provides the stored data according to a request of the control unit 1940.

The control unit 1940 controls overall operations of the base station. For example, the control unit 1940 transmits and receives signals through the baseband processing unit 1920 and the RF processing unit 1910. According to an embodiment of the present invention, the control unit 1940 includes an interference relation determination unit 1942 that determines an interference relation on the basis of information collected from other nodes, and a scheduler 1944 that allocates resources on the basis of the interference relation. For example, the control unit 1940 controls the node to perform the procedures illustrated in FIG. 8, FIG. 11, FIG. 15, and FIG. 17. An operation of the control unit 1940 according to an embodiment of the present invention is as follows.

According to an embodiment of the present invention, the control unit 1940 receives a message, which includes information on an adjacent link of another node in the network, through the RF processing unit 1910 and the baseband processing unit 1920. The message may include at least one of the number of adjacent links, source addresses of the respective adjacent links, destination addresses thereof, durations thereof, and channel qualities thereof. The control unit 1940 determines an interference relation between links in the network on the basis of the information on the adjacent link, and stores information on the interference relation in the storage unit 1930. According to an embodiment of the present invention, the control unit 1940 may determine that an interference relation is established between a link, that the information on the adjacent link has notified of as an adjacent link, and a link of a node, that has transmitted the information on the adjacent link. According to another embodiment of the present invention, when the channel quality of a signal of the adjacent link is collected through the information on the adjacent link, the control unit 1940 may determine an interference relation on the basis of a throughput of the entire network in a case where an identical resource is allocated. For example, even in the case of the link that the information on the adjacent link has notified of as an adjacent link, the control unit 1940 may predict and calculate a first capacity in a case where an identical resource is allocated, and a second capacity in a case where different resources are allocated, on the basis of the channel quality, and then may not determine that the link has an interference relation when the first capacity is larger than the second capacity.

Also, when duration information of the adjacent link is collected through the information on the adjacent link, the control unit 1940 may update the interference relation on the basis of the duration information. For example, when a time period indicated by the duration information elapses, the control unit 1940 may determine that the relevant adjacent link is subjected to extinction, and may delete an interference relation with the link subjected to the extinction.

Also, the control unit 1940 may allocate resources to links in the network on the basis of the interference relation. Specifically, the control unit 1940 determines a spatial reuse factor of each link on the basis of the interference information, and determines a set of links capable of being allocated an identical resource. In other words, the control unit 1940 allocates an identical resource to links which do not interfere with each other.

Further, the control unit 1940 may consider a beam combination of other nodes in the network. The control unit 1940 determines at least one interference relation corresponding to at least one beam combination of the other nodes in the network. To this end, the control unit 1940 may receive a message including adjacent link information on multiple available beams. Alternatively, the control unit 1940 may direct each of the other nodes to change a beam, and may control each of the other nodes to repeatedly report adjacent link information measured by using the changed beam. Then, the control unit 1940 determines an optimal interference relation among the at least one interference relation, and controls beams of the other nodes to form the optimal interference relation. For example, the control unit 1940 may select an interference graph having the highest resource efficiency. The resource efficiency may be determined based on various criteria, and as an example, may be determined based on a spatial reuse factor.

Methods according to claims of the present invention or embodiments described in the specification of the present invention may be implemented in the form of hardware, software, or a combination of hardware and software.

When the methods are implemented in software, a computer-readable storage medium that stores one or more programs (software modules) may be provided. The one or more programs stored in the computer-readable storage medium may be configured for execution by one or more processors within an electronic device. The one or more programs may include instructions which cause the electronic device to perform the methods according to the claims of the present invention or the embodiments described in the specification of the present invention.

The programs (software modules or software) may be stored in random access memories, non-volatile memories including flash memories, Read Only Memories (ROMs), Electrically Erasable Programmable Read Only Memories (EEPROMs), magnetic disc storage devices, Compact Disc-ROMs (CD-ROMs), Digital Versatile Discs (DVDs), other types of optical storage devices, or magnetic cassettes. Alternatively, the programs may be stored in a memory configured by a combination of some or all of such storage devices. Also, each of the memories may be provided in plurality.

Further, the programs may be stored in an attachable storage device that can be accessed by the electronic device through a communication network such as the Internet, Intranet, Local Area Network (LAN), Wireless LAN (WLAN), or Storage Area Network (SAN), or through a communication network configured by a combination thereof. This storage device may be connected through an external port to the electronic device performing embodiments of the present invention. Alternatively, a separate storage device on a communication network may be connected to the electronic device performing embodiments of the present invention.

In the above-described specific embodiments of the present invention, the elements included in the present invention are expressed in a singular form or a plural form according to the proposed specific embodiment. However, the singular or plural expression is selected appropriately for a situation proposed for convenience of description, the present invention is not limited to a single element or a plurality of elements, and the elements expressed in a plural form may be configured as a single element or an element expressed in a singular form may be configured as a plurality of elements.

While the specific embodiments have been described in the detailed description of the present invention, it goes without saying that various changes in form and details may be made therein without departing from the scope of the present invention. Therefore, the scope of the present invention should not be defined as being limited to the described embodiments, but should be defined by the appended claims and equivalents thereof.

What is claimed is:

1. A method of a first node using a first link to communicate with a second node in a wireless communication system, the method comprising:
   decoding a signal to acquire information on a second link between a third node and a fourth node, wherein the signal is considered as interference to the first node; and
   transmitting a message including the information on the second link to a control node that performs scheduling,
   wherein the information on the second link comprises at least one of information regarding a destination of the signal and information regarding a source of the signal.

2. The method of claim 1, further comprising:
   measuring a channel quality of the signal.

3. The method of claim 1, wherein the signal is beamformed by the third node or the fourth node.

4. A method of a control node for performing scheduling in a wireless communication system, the method comprising:
   receiving, from a first node using a first link with a second node, a message including information on a second link between a third node and a fourth node delivering a signal, wherein the signal is considered as interference to the first node; and
   determining an interference relation between the first link and the second link in a network based on the information included in the message,
   wherein the information on the second link comprises at least one of information regarding a destination of the signal and information regarding a source of the signal.

5. The method of claim 4, wherein determining of the interference relation comprises:
   determining that a link of the first node and at least one link, that is indicated as an adjacent link by the message, have an interference relation.

6. The method of claim 4, wherein determining of the interference relation comprises:
   calculating a first capacity in a case where an identical resource is allocated for a first link of the first node and a second link that is indicated as an adjacent link by the message, and a second capacity in a case where different resources are allocated for the first link and the second link, based on a channel quality of an adjacent link included in the message; and
determining that the first link and the second link have the interference relation, when the second capacity exceeds the first capacity.

7. The method of claim 4, further comprising performing scheduling which allocates an identical resource to links, which do not interfere with each other, based on the interference relation.

8. The method of claim 7, wherein performing of the scheduling comprises:
mutually exclusively allocating resources to links included in a set of links having a maximum spatial reuse factor; and
allocating at least a part of the resources, which are allocated to the links, in an overlapping manner to another link which does not mutually interfere with a relevant link.

9. The method of claim 4, wherein determining of the interference relation comprises:
determining multiple interference relations corresponding to multiple beam combinations of nodes in the network; and
selecting one interference relation from among the multiple interference relations.

10. The method of claim 9, further comprising changing beam allocation for the nodes so as to use a beam combination corresponding to the selected one interference relation.

11. An apparatus of a first node using a first link to communicate with a second node in a wireless communication system, the apparatus comprising:
at least one processor configured to decode a signal to acquire information on a second link between a third node and a fourth node, wherein the signal is considered as interference to the first node; and
a transceiver configured to transmit a message including the information on the second link to a control node that performs scheduling,
wherein the information on the second link comprises at least one of information regarding a destination of the signal and information regarding a source of the signal.

12. The apparatus of claim 11, wherein the at least one processor is further configured to measure a channel quality of the signal.

13. An apparatus of a control node for performing scheduling in a wireless communication system, the apparatus comprising:
a transceiver configured to receive, from a first node using a first link with a second node, a message including information on a second link between a third node and a fourth node delivering a signal, wherein the signal is considered as interference to the first node; and
at least one processor configured to determine an interference relation between the first link and the second link in a network based on the information included in the message,
wherein the information on the second link comprises at least one of information regarding a destination of the signal and information regarding a source of the signal.

14. The apparatus of claim 13, wherein the at least one processor is further configured to determine that a link of the first node and at least one link, that is indicated as an adjacent link by the message, have an interference relation.

15. The apparatus of claim 13, wherein the at least one processor is further configured to:
calculate a first capacity in a case where an identical resource is allocated for a first link of the first node and a second link that is indicated as an adjacent link by the message, and a second capacity in a case where different resources are allocated for the first link and the second link, based on a channel quality of an adjacent link included in the message; and
determine that the first link and the second link have the interference relation, when the second capacity exceeds the first capacity.

16. The apparatus of claim 13, wherein the at least one processor is further configured to perform scheduling which allocates an identical resource to links, which do not interfere with each other, based on the interference relation.

17. The apparatus of claim 16, wherein the at least one processor is further configured to:
mutually exclusively allocate resources to links included in a set of links having a maximum spatial reuse factor; and
allocate at least a part of the resources, which are allocated to the links, in an overlapping manner to another link which does not mutually interfere with a relevant link.

18. The apparatus of claim 13, wherein the at least one processor is further configured to:
determine multiple interference relations corresponding to multiple beam combinations of nodes in the network; and
select one interference relation from among the multiple interference relations.

19. The apparatus of claim 18, wherein the at least one processor is further configured to:
change beam allocation for the nodes so as to use a beam combination corresponding to the selected one interference relation.

20. The apparatus of claim 11, wherein the signal is beamformed by the third node or the fourth node.

* * * * *